United States Patent
Hanneken et al.

(10) Patent No.: US 8,613,303 B1
(45) Date of Patent: Dec. 24, 2013

(54) TIRE CHANGING MACHINE WITH FORCE DETECTION AND CONTROL METHODS

(75) Inventors: Douglas S. Hanneken, St. Louis, MO (US); David A. Voeller, St. Louis, MO (US); Charlie Polster, Edwardsville, IL (US); Joel Clasquin, Edwardsville, IL (US); Michael D. Gerdes, St. Peters, MO (US); Nicolas J. Colarelli, III, St. Louis, MO (US)

(73) Assignee: Hunter Engineering Company, St. Louis, MO (US)

( * ) Notice: Subject to any disclaimer, the term of this patent is extended or adjusted under 35 U.S.C. 154(b) by 202 days.

(21) Appl. No.: 12/504,217

(22) Filed: Jul. 16, 2009

Related U.S. Application Data

(60) Provisional application No. 61/081,454, filed on Jul. 17, 2008.

(51) Int. Cl.
*B60C 25/138* (2006.01)

(52) U.S. Cl.
USPC ........................................ 157/1.17; 157/1.24

(58) Field of Classification Search
USPC .................. 157/1, 1.17, 1.24, 1.26, 1.28, 1.34
See application file for complete search history.

(56) References Cited

U.S. PATENT DOCUMENTS

| | | | |
|---|---|---|---|
| 6,527,032 B2 * | 3/2003 | Corghi | 157/1.28 |
| 6,877,544 B2 * | 4/2005 | Kane et al. | 157/1.24 |
| 7,089,987 B2 * | 8/2006 | Gonzaga | 157/1.17 |
| 7,188,656 B2 * | 3/2007 | Gonzaga | 157/1.17 |
| 7,404,427 B2 * | 7/2008 | Hillman et al. | 157/1 |
| 7,699,087 B2 * | 4/2010 | Rogalla et al. | 157/1.1 |
| 2011/0100558 A1 | 5/2011 | Corghi | |

FOREIGN PATENT DOCUMENTS

| | | |
|---|---|---|
| EP | 1479538 A2 | 11/2001 |
| IT | 1263799 B | 8/1996 |
| IT | M1951050 A1 | 11/1996 |

* cited by examiner

*Primary Examiner* — Hadi Shakeri
(74) *Attorney, Agent, or Firm* — Armstrong Teasdale LLP

(57) ABSTRACT

Tire changing machines having force feedback and position control systems are described that may be used to control operation of one or more components of the machine during a tire change procedure. Information may be provided to a machine operator concerning detected operating conditions during the procedure. Excessive or abnormal forces or component positions can be detected and corrective action may be taken at any point in the tire change procedure. Successful component position profiles may be saved for future recall and execution by the machine.

41 Claims, 16 Drawing Sheets

TIRE CHANGING MACHINE WITH FORCE DETECTION AND CONTROL METHODS

CROSS REFERENCE TO RELATED APPLICATIONS

This application claims the benefit of U.S. Provisional Application Ser. No. 61/081,454 filed Jul. 17, 2008, the entire disclosure of which is hereby incorporated by reference in its entirety.

BACKGROUND OF THE INVENTION

The field of the invention relates generally to machines for changing a tire on a wheel rim, and more specifically to tire changing machines having force detection, position detection and control capability.

The process of removing a tire from a wheel rim and replacing it with another tire, referred to herein as tire changing, can be difficult. In response to such difficulties, machines have been developed to facilitate the tire changing process. The machines commonly include a clamping mechanism and a drive mechanism that rotates the wheel rim about an axis. A bead breaker tool exerts pressure on the tire adjacent the wheel rim to break the tire bead seal, and a tire removal tool, which may be either manually inserted by a machine operator or integrated into the machine itself, is used to pull the bead of the tire off the wheel rim as the wheel rim is rotated, allowing the tire to be separated from the rim for removal. Manual or machine implemented tools are also utilized to press the tire onto the wheel rim for installation. While known machines have obtained some level of success in reducing the time and labor associated with changing a tire, there remains room for improvement.

BRIEF DESCRIPTION OF THE INVENTION

Advantageous embodiments of machines for changing tires on a wheel rim, and control systems and methods for tire changing machines are disclosed that provide numerous benefits and improvements over existing tire changing machines.

In one embodiment, a machine for changing a tire on a wheel rim is disclosed. The machine includes a base, a drive assembly for rotating the wheel rim and tire about a drive axis, a position sensor associated with the drive assembly for determining a position of the wheel rim, and a tire retention feature for securing the wheel rim to the rotating drive assembly. The machine further includes at least one actuator and at least one component for engaging and manipulating the wheel rim and/or tire during a tire change procedure. The actuator is operatively coupled to a controller, and at least one sensor is provided to generate a feedback signal indicative of force applied the tire and/or wheel rim during tire changing operations. The sensor communicates with the controller and provides a feedback control signal that can be used by the controller to more effectively operate and control the machine during a tire change procedure. In exemplary embodiments, feedback signals indicative of force may be generated by directly monitoring actuator force, or via indirect monitoring of force via monitoring of acceleration, torque, deflection and displacement of the component or other portions of the machine during the tire change procedure.

In various embodiments, the component may be for example, a tire changing tool provided on the machine or a drive assembly component. In various embodiments, the tire changing tool, may be one of a bead pusher tool, a bead breaker tool, a tire mount tool, a tire inflation tool, and a tire de-mount tool. In different exemplary embodiments, the drive assembly component may be a drive motor, a positioning motor, or a wheel rim mount element. The actuator may be a rotational actuator or a linear actuator for the component. Various types of sensors may be used to provide feedback signals indicative of force. Multiple sensors generating feedback signals indicative of force associated with multiple components may be provided and used in combination to control the machine.

Using the feedback signal(s) indicative of force, real-time feedback and information may be provided to the machine operator of detected operating conditions during a tire change procedure. As such, the operator may be provided with informational feedback of actual operating conditions, whether acceptable or unacceptable, to guide the operator through the tire change procedure. In the case of unacceptable detected conditions, the controller may undertake corrective action to avoid undesirable consequences, and provide further instruction to the machine operator. Haptic feedback elements may also be provided to provide intuitive guidance to the human operator of the machine regarding a position of the component and the feedback signal indicative of force applied to the tire and/or wheel rim during a tire change procedure.

A position sensor associated with the component may also be input to the controller for further use in evaluating tire changing processes in combination with the feedback signal indicative of force. Acceptable data profiles for operation of the component may be saved in a memory of the controller for future recall by an operator, and for convenient re-execution upon demand to change tires in an optimal, and largely fully automatic manner after successful tire change procedures are once completed. A plurality of unique operational profiles may be created providing for distinct operation of machine components depending on which profile has been selected for execution.

Methodology is also disclosed for controlling a tire machine to achieve numerous advantages and benefits over existing tire changing machines.

BRIEF DESCRIPTION OF THE DRAWINGS

Non-limiting and non-exhaustive embodiments are described with reference to the following Figures, wherein like reference numerals refer to like parts throughout the various views unless otherwise specified.

FIGS. 10-19 illustrate method flowcharts of exemplary processes of changing a tire utilized by and with an exemplary tire changing machine having one of the exemplary control systems shown in FIGS. 2-9, wherein;

FIG. 10 is a method flowchart of an exemplary processes of operating the machine in exemplary tire change procedures;

FIG. 11 illustrates a tire demount initialization routine;

FIG. 12 illustrates a rim edge location routine;

FIG. 13 illustrates a wheel weight detection routine;

FIG. 14 illustrates a bead breaking routine;

FIG. 15 illustrates a wheel weight removal routine.

FIG. 16 illustrates an operator warning routine;

FIG. 17 illustrates an operator cancel routine;

FIG. 18 illustrates a valve stem interrupt routine; and

FIG. 19 illustrates tire bead unseat verification routine.

DETAILED DESCRIPTION OF THE INVENTION

Exemplary embodiments of tire changing machines and methods are described in detail below. The tire changing machines and methods facilitate efficient tire changing with reduced difficulty for machine operators and with improved control features. Information may be provided to machine operators concerning successful operation of the machine. Corrective action and instructions may be provided to avoid inadvertent damage to the wheel rim, damage to the machine itself, and/or potentially hazardous operating conditions during tire changing processes.

Figure 1A:
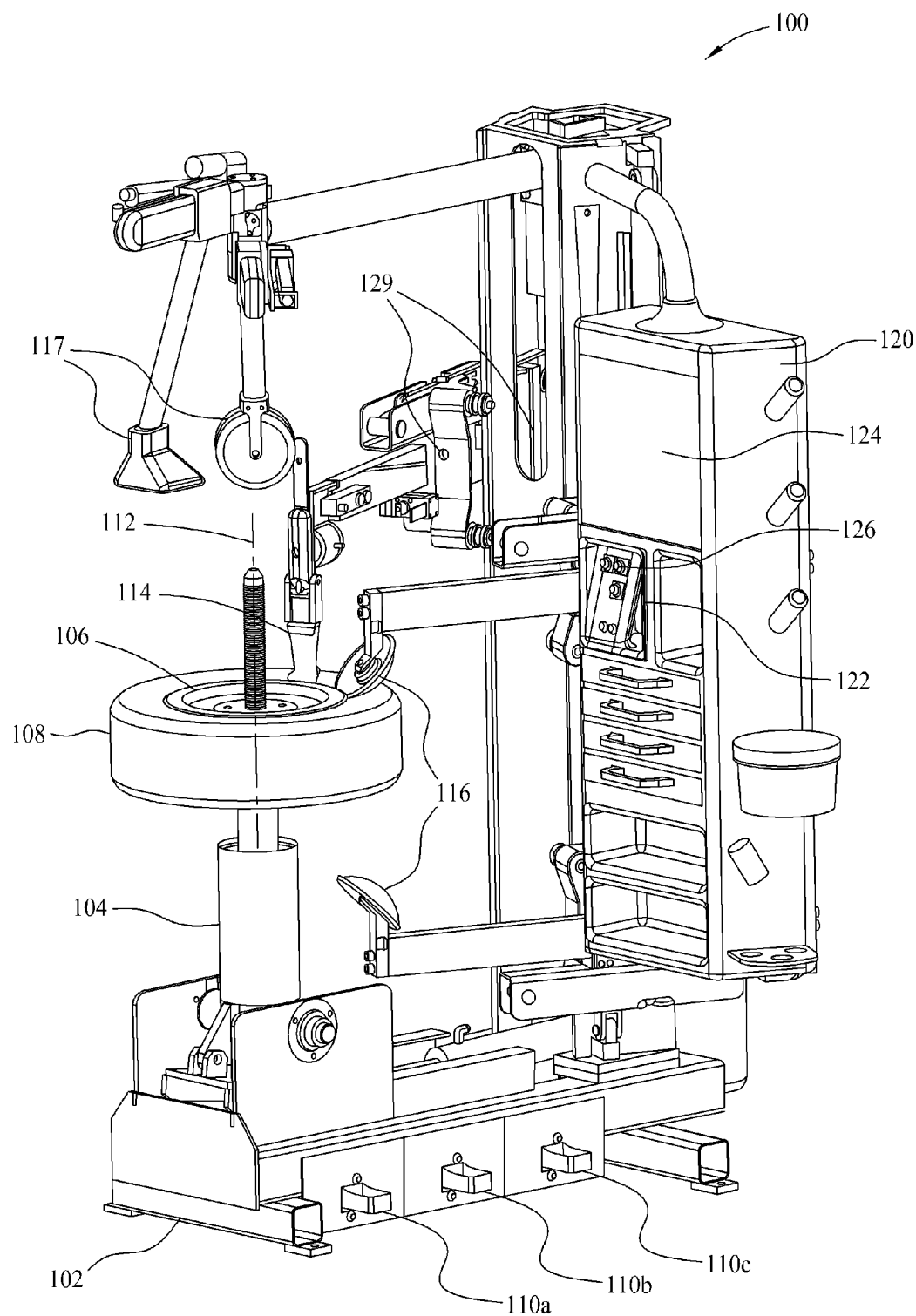
FIGS. 1a, 1b and 1c are respective views of an exemplary embodiment of a tire changing machine in a perspective view, a magnified view, and a sectional view.
Figure 1B:
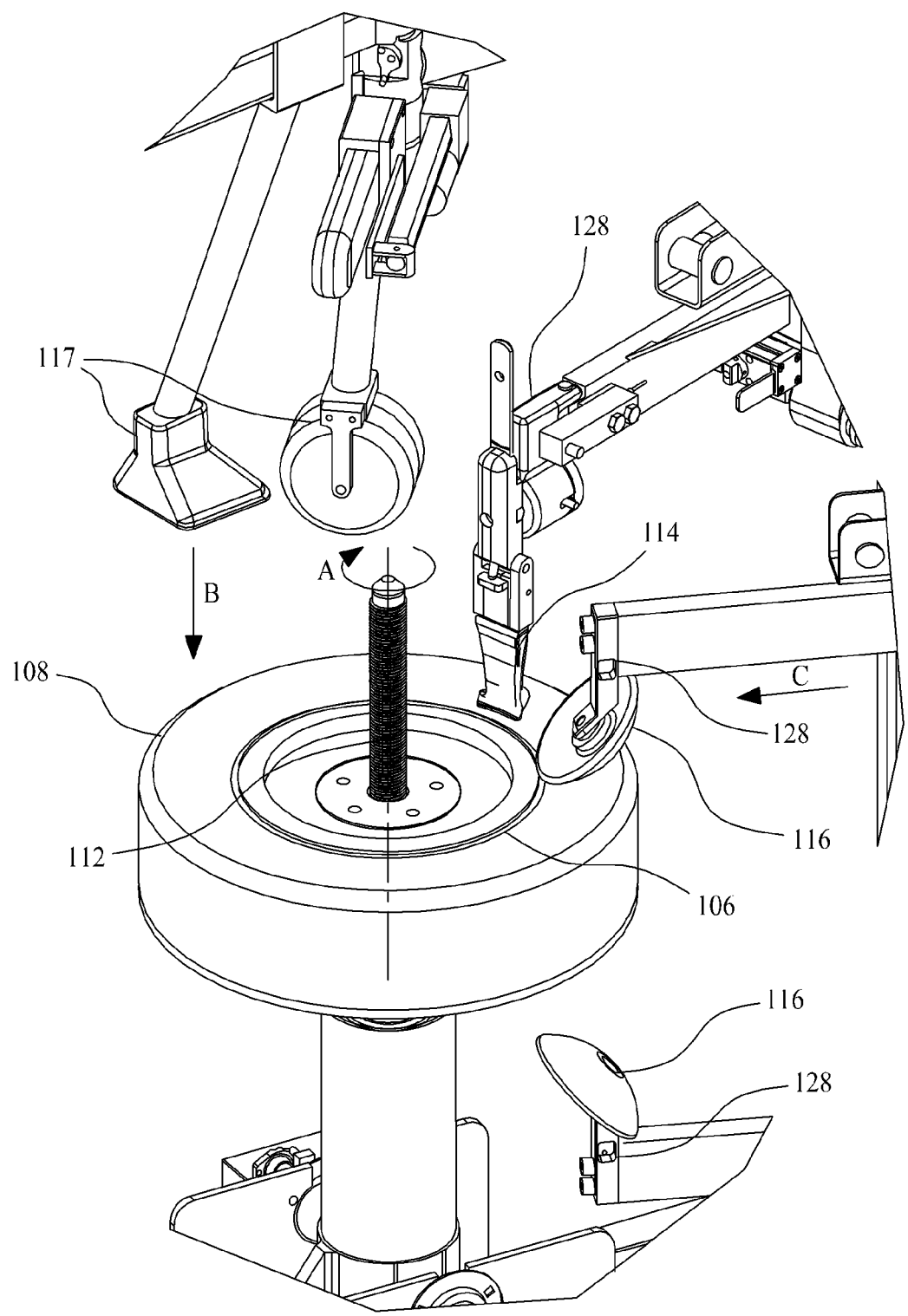
Figure 1C:
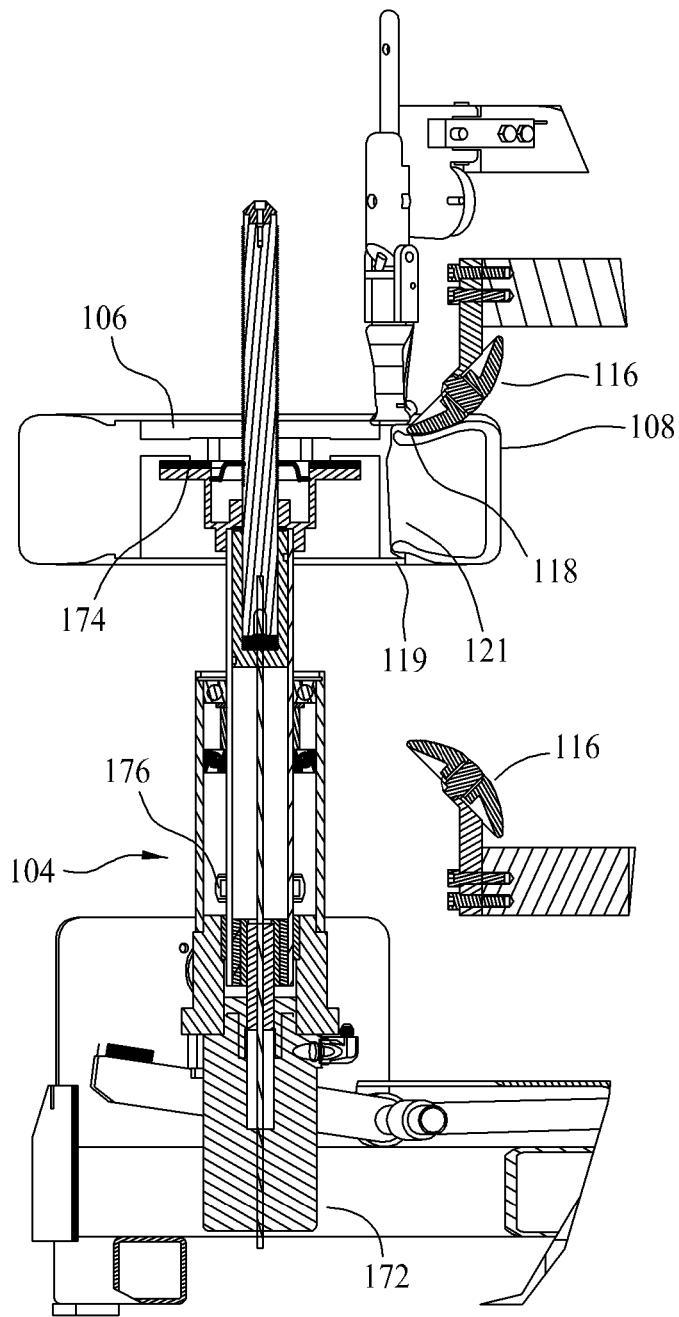

FIGS. 1a, 1b and 1c illustrate an exemplary tire changing machine 100 including a frame or base 102 and a rotatable drive shaft assembly 104 attached to the base 102. The drive shaft assembly 104 may include a post or shaft positioned centrally on the base 102, and the shaft is adapted to receive and retain a wheel rim 106 having a tire 108 at a mounting station 105. The wheel rim 106 may be secured to the drive shaft assembly 104 with a known clamping mechanism after the wheel rim 106 and tire 108 is loaded and mounted onto the machine 100. After the wheel rim 106 is clamped in position, a machine operator manipulates an input selector 110a which operates the drive shaft assembly 104 to rotate the wheel rim 106 and tire 108 about a drive axis 112 in the direction of arrow A (FIG. 1b). In different exemplary embodiments, the drive shaft assembly 104 may be pneumatically or hydraulically actuated or powered electrically. In another embodiment, a rotating turntable or other mechanism may be provided in lieu of the drive shaft assembly 104.

While the drive axis 112 is illustrated as being generally vertical in the embodiment depicted, the axis 112 may be oriented horizontally or otherwise in other embodiments, and the axis 112 may be selectively positionable in different positions relative to the base 102.

As the wheel rim 106 is rotated about the axis 112, one or more tire changing tools 114, 116 and 117 may be brought into physical contact or engagement with the tire 108 in the direction of arrow B (FIG. 1b) at respective locations proximate an outer periphery of the rim 106. The machine operator may visually move the tools 114, 116 and 117 into the proper position with respect to the tire 108 and wheel rim 106, and then the tire 108 and wheel rim 106 are rotated about the axis 112 with the tools 114, 116 and 117 engaged to the tire 108 to install or remove the tire.

The tool 114 is sometimes referred to as tire mount or demount tool. The tool 114 may include a wedge that is extended into an area between the wheel rim 106 and the tire 108 to separate an inner circumference of the tire 108 including the bead 118 (FIG. 1c) over the outer lip 119 (FIG. 1c) of the wheel rim 106 to remove the tire 108, or to engage the inner circumference of the tire 108 including the bead 118 on the outer lip 119 of the wheel rim 106 to install the tire 108. The tire 108 may be appropriately lubricated to facilitate easier removal and installation using the tool 114.

The tools 116 are sometimes referred to as bead breaker tools that exert pressure on the tire 108 to either break the tire bead seal 118 with the rim 106 or push the inner circumference of the tire 108 over the outer lip of the wheel rim 106 to install the tire 108. As shown in the exemplary embodiment in FIGS. 1a and 1b, two tools 116 are shown, one located above the tire 108 and the other located below the tire 108. In another embodiment, a single bead breaker tool could be provided.

The tools 117 are sometimes referred to as pressing tools. As shown in the exemplary embodiment in FIGS. 1a and 1b, two pressing tools 117 are shown that exert pressure on the tire sidewall in tire mounting and demounting procedures. Each pressing tool 117 is differently configured, one as a roller and the other having being adapted for stationary contact with the tire 108. The pressing tools 117 may be spaced from one another to maintain the tire bead 118 in a drop center 121 (FIG. 1c) of the wheel rim 106 during tire de-mounting procedures, or to push the tire bead 118 into the drop center 121 in a tire mounting procedure. While two or more pressing tools 117 are beneficial for mounting or de-mounting larger diameter tires and stiffer tires, one pressing tool may be provided in another embodiment and may be sufficient to change smaller diameter and more compliant tires.

The tools 114, 116, and 117 serve to supply sufficient tire insertion or removal forces at the correct angle and location with respect to the tire 108 such that the bead 118 of the tire 108 is forced out of or onto a bead seat on the wheel rim 106. While exemplary tire changing tools 114, 116, and 117 are illustrated, still other tire changing tools may be provided and used for bead breaking, tire mounting and/or demounting, locating a valve stem, locating a wheel weight, locating a wheel sensor such as a Tire Pressure Monitoring System (TPMS) sensor, or other purposes. Such other tools may be provided in addition to or in lieu of the tools 114, 116 and 117 as depicted.

Like many known machines, the effectiveness of the tire changing machine 100 is largely dependent on the ability of its operator to prepare the rim 106 and correctly position the tire changing tools 114, 116 and 117 to install or remove the tire 108 from the wheel rim 106. The bead breaker tool 116 and the mount and demount tool 114 exert respective pressure on the tire 108 to seat or unseat the tire bead 118 from the rim 106 when installing or removing the tire 108. If any of the tools 114, 116 or 117 are inadvertently placed in contact with the rigid wheel rim 106 or the rather rigid sidewall of the tire 108, the applied forces generated by the machine 100 through the tools 114, 116 and 117 may damage the wheel rim, the tire, or components of the machine 100. Safety issues are posed by the large amounts of force that can be generated in such instances. Additionally, if the wheel rim 106 includes wheel weights and the wheel weights have not been removed, one or more of the tire changing tools 114, 116 and 117 can come in contact with a wheel weight installed at the rim edge, causing the wheel weight to slide as the wheel is rotated and potentially damaging the rim.

During tire mounting and demounting procedures significant forces can build up that have the potential to damage the tire bead 118, other portions of the tire 108, or the mount/demount tool 114 or other of the tire changing tools 116 and 117. By monitoring the tactile forces in mounting and demounting procedures, tool damage can be prevented by adjusting operation of the machine in response to the detected tactile forces. Such adjustments in operation of the machine may include stopping motor rotation in the drive assembly 104, reducing the speed of rotation in the drive assembly 104, reducing the motor torque applied during rotation of the drive assembly 104, or reducing the applied forces of one or more of the tools 114, 116 and 117.

More specifically, when the bead rollers 116 are used to exert pressure on the tire 108 to break the tire bead seal 118, the rollers 116 are first brought into contact with the tire 108 as near to the lip of the rim 106 as possible. Down force is applied to the upper roller 116 in a direction (indicated by arrow B in FIG. 1b) that is parallel to the wheel axis 112 to push the tire bead 118 off of the rim 106. If the roller 116 is inadvertently placed on the wheel rim 106, however, very large forces may be generated very quickly with very little movement between the upper roller 116 and the comparatively rigid and unforgiving rim that may result in damage to the tire 108, the rim 106, or to components of the machine. In contrast, if the roller 116 is correctly placed on the tire 108 there will be a more gradual increase in force along with movement of the tool as the tire bead 118 (FIG. 1c) is pressed away from the rim.

Further, assuming that the upper roller 116 has successfully dislodged the tire bead 118 from the wheel rim 106, further positioning of the roller 116 is often necessary. Specifically, it has been found that after a slight movement in the axial direction of arrow B it is then necessary to drive the roller 116 in a lateral direction (indicated by arrow C in FIG. 1b) that is perpendicular to the drive axis 112. This is necessary because otherwise the roller 116 will deform the sidewall of the tire 108 and then slide along the sidewall without removing the tire bead 118 from the wheel rim 106. If the roller 116 is moved toward the tire bead 118 it is able to act on a more stiff area of the tire which is typically closer to the bead and thereby remove the tire bead 118 from the wheel rim 106. The lateral movement of the rollers 116 in a direction transverse to the drive axis 112 as shown by arrow C presents additional opportunities for operator error in inadvertently placing the tool 116 in contact with the rim 106. Even if properly moved in the direction of arrow C to successfully dislodge the tire bead 118, the operator must remember to move the tool back in a direction opposite to arrow C before lifting it from the tire, or it will undesirably hit the wheel rim 106. Some operators are prone to overlooking this aspect of the procedure. As explained below, exemplary control systems provided in the machine 100 may automatically compensate for such difficulties and avoid human error in this regard.

As the wheel rim 106 and tire 108 are rotated about the axis 112 the tool 114 applies appropriately directed force to the tire 108 to either direct the tire 108 off of the wheel rim 106 (demounting) or onto the wheel rim 108 (mounting). The machine operator, however, may not have the tool 114 in the proper location, may not have the tire 108 in the correct position relative to the rim 106, or may rotate the wheel rim 106 at too high of a speed about the axis 112, all of which tend to place the tool in a bind. If the operator does not realize that the tool 114 is binding and continues with the procedure, damage can occur to the tire or to the tool.

In an effort to address difficulties in properly locating the tire changing tools 114 and 116 and undesirable consequences of improper tool placement, some machines are known having a sensory capability to detect a position of tools such as the tools 114 and 116 with respect to the tire 108 and/or wheel rim 106. For example, one known tire changing machine includes a switch mechanism that changes state when the bead breaker tool moves just beyond the outer edge of the rim, ensuring that the bead breaker is positioned to engage a tire at a predetermined location. Machine vision systems are also known that help align bead breaker tools with respect to the wheel rim at predetermined locations. Such features have enjoyed varying degrees of success in avoiding human error in positioning the tools, but are nonetheless subject to the limitations of the operators to correctly utilize such features. The tools 114 and 116 may still be incorrectly positioned on the rim or on the tire sidewall, creating undesirable operating conditions.

While perhaps less likely than for the tools 114 and 116, it is possible for a machine operator to improperly position the pressing tools 117, either in contact with the wheel rim 106 or at another location that could inadvertently cause damage to the tire 108, the rim 106 or component of the machine 100.

Even if the tools 114, 116 and 117 are correctly located on the tire 108, the applied force generated by the tools 114, 116 and 117 can still be quite large during tire installation and removal processes, and such forces can be somewhat difficult to control. Particularly during tire removal processes, a large buildup of force in the bead breaker tools 116, for example, can suddenly be released when the tire bead seal is broken and the tire 108 deflects away from its seated location on the rim 106, resulting in practically uncontrollable movement of the tool 116. This is particularly the case for pneumatically actuated tools where a rapid loss in back pressure occurs as the tire bead is loosened, but to some extent many different types of actuators pose similar issues. Consequently, some damage to the tire 108, the wheel rim 106, wheel sensors within the tire and wheel rim assembly, and/or machine components may result even when the tools 114, 116 and/or 117 are properly positioned. Likewise, the spontaneous release of large amounts of energy can be jarring to machine operators, as well as potentially hazardous.

To avoid undesirable effects due to misplacement of the tools 114, 116 and 117 on the tire 108 or due to improperly preparing the rim for tire removal, the machine 100 is provided with sensors, controls and interfaces described below that overcome numerous disadvantages of existing tire changing machines. The tools 114, 116 and 117 are coordinated by a control unit 120 that may include a controller (discussed below) and actuator components operatively connected to the controller for moving the tools 114, 116 and 117 to various positions to accommodate varying sizes and diameters of wheel rims 106. As will be explained below, the actuators may include, for example hydraulic cylinders, pneumatic actuators, and/or electric motors in illustrative embodiments. The tools 114, 116 and 117 may be independently movable from one another, in response to outputs from the control unit 120, along one or more axes of motion. The control unit 120 may accept exemplary inputs from known positioning encoders, Hall Effect sensors, and machine vision techniques to aid in the proper positioning of the tools 114, 116 and 117 with respect to the tire 108 and the rim 106.

A machine operator may manipulate input selectors 110b and 110c, for example, which communicate with the control unit 120 to move the tools 114, 116 and 117 to desired positions. These input selectors may have the capability to override automated inputs made by a controller which is part of control unit 120. In illustrative embodiments, the input selectors 110a, 110b and 110c may be foot pedals located near the bottom of the machine base 102 for convenient use of the machine operator(s). In other embodiments, other known input selectors, including but not limited to levers, buttons, knobs, switches, joysticks, and touch sensitive screens may be employed in various locations on or near the machine 100. An operator station 122 including a display 124 and an input device 126 including a keyboard or other input selectors may be optionally provided for the benefit of the operator. Still other features of the machine may be provided, such as tire inflation systems and the like familiar to those in the art.

As will be explained in relation to the following figures, the machine control system, which includes the control unit 120, also includes force detection elements 128 (FIG. 1*b*) and position detection elements 129 (FIG. 1*a*) for more effective control of the tools 114, 116 and 117 in use. While one force detecting element 128 and two positioning elements are depicted, it is understood that other numbers of force and position detection elements may be provided in various locations on the machine 100. As shown in FIG. 1*b*, the force detection element 128 may be provided on a tool mounting bracket, although it could be located elsewhere in the machine such as a mounting element for a tool actuator that couples the actuator to the machine supporting structure. For example, as the tool actuator moves the tool 114 toward or away from the rotation axis to radially position the tool 114 relative to the drive axis 112, or a tool actuator that moves the tool toward and away from the rim and tire in a direction parallel to the drive axis 112, force may be detected as the tool engages the tire 108 and/or the wheel rim 106. Likewise, the position detecting elements 129 are shown at particular locations in FIG. 1*a*, but they could be located elsewhere in other embodiments. Also, various types of sensors capable of use for the force and detection elements 128 and 129 are explained below.

As will become evident below, the force and position detection elements 128, 129 and control components associated with them are beneficially provided to facilitate safer and smoother tire installation and removal processes in an optimized manner with reduced potential for hazardous conditions to the machine operator. The force and position detection and control features facilitate beneficial methods of tire changing using the machine to perform various tire change procedures. The force detection elements 128 and 129 and controls such as those described below further provide advantageous informational feedback to the machine operator concerning expected or normal operating conditions to confidently guide the operator through a tire change procedure. Still further, the force and position detection elements 128 and 129 and control features also facilitate detection of abnormal or undesirable operating conditions that may otherwise result in damage to the rim, tire, or the tire changing machine. Operator safety may be enhanced with intuitive operator interfaces and controls.

The force detection assemblies, methods and systems disclosed below advantageously limit applied force to predetermined force levels in order to prevent damaging a tire, wheel rim, or tire changer part. Also, when used in combination with a location sensor or other positioning system known in the art, a determination can be made as to whether the force is effective or not (i.e. whether a drop in force was measured as the tire bead 118 (FIG. 1*c*) is moved out of the bead seat of the wheel rim 106 so that appropriate action can be taken, including but not limited to activating an error mode wherein further application of force by one or more of the tools 114, 116 and 117 is suspended, operating actuator elements for the tools 114, 116 and 117 to anticipate or respond to a sudden drop in force as the tire bead seal breaks to provide more control of the tools 114, 116 and 117 after the tire bead seal is broken, and providing a warning to the operator via a display or haptic feedback elements to let the operator know how much force has been released. Such force sensing and detecting capability may allow tire change procedures to be safely automated.

Exemplary control systems are described below in relation to FIGS. 2-9 including tactile feedback features allowing more effective control of the machine 100 and its components, and exemplary tire change procedures, methods, algorithms and machine routine responsive to such tactile feedback are described below in relation to FIGS. 10-19. The various components utilized by the machine in tire changing operations may be driven by various types of actuators, including actuators providing rotational output movement (i.e., rotary actuators), and actuators providing linear output movement (i.e., linear actuators). The actuators for the components may be powered in various ways, including electric, hydraulic and pneumatic power.

As will be seen from the exemplary embodiments discussed below, various types of force feedback sensors may be used as the force detection elements 128 for the tire changing tools or other components. For example, the force detection elements 128 may include electrical sensors (e.g., voltage, current, inductive, capacitive, magnetic or resistive sensors), pressure sensors, optical sensors, imaging sensors, load bearing sensors, force sensors, acceleration sensors, torque sensors, deflection sensors and displacement sensors may be utilized with various types of actuators to provide feedback signals indicative of force (either directly or indirectly wherein force could be calculated or otherwise determined based on the feedback signal) applied by or generated in a component of the machine during a tire change procedure. Combinations of force feedback sensors for different components may be utilized in combination, and force may be detected along multiple axes of movement for the same or different components. While the following exemplary systems and procedures are described primarily in relation to operation of the tire changing tools, it is understood that feedback signals directly or indirectly indicative of force could be obtained by monitoring components other than the tools and tool actuators, such as components in the drive assembly or still other components in the machine.

In addition to tactile force feedback, in certain embodiments the machine control systems are enhanced with one or more position detecting sensors. A variety of position detecting sensors, including but not limited to Hall Effect sensors, capacitive sensors and Linear Variable Differential Transformer (LVDT) sensors familiar to those in the art, may be utilized to directly indicate a position of a movable machine component, or to indirectly indicate a position of a movable machine component by detecting speed or acceleration of a moving component. In other embodiments, positioning encoders, machine vision techniques or still other position detection elements may be utilized to allow a position of one or more components to be determined.

Positional feedback information for rotational movement and linear movement among multiple axes of motion for a variety of machine components can be used in combination with force detection feedback features to automate a variety of tire change procedures in whole or in part to provide machines of varying sophistication, and to detect a variety of normal and abnormal operating conditions of the machine.

Figure 2:
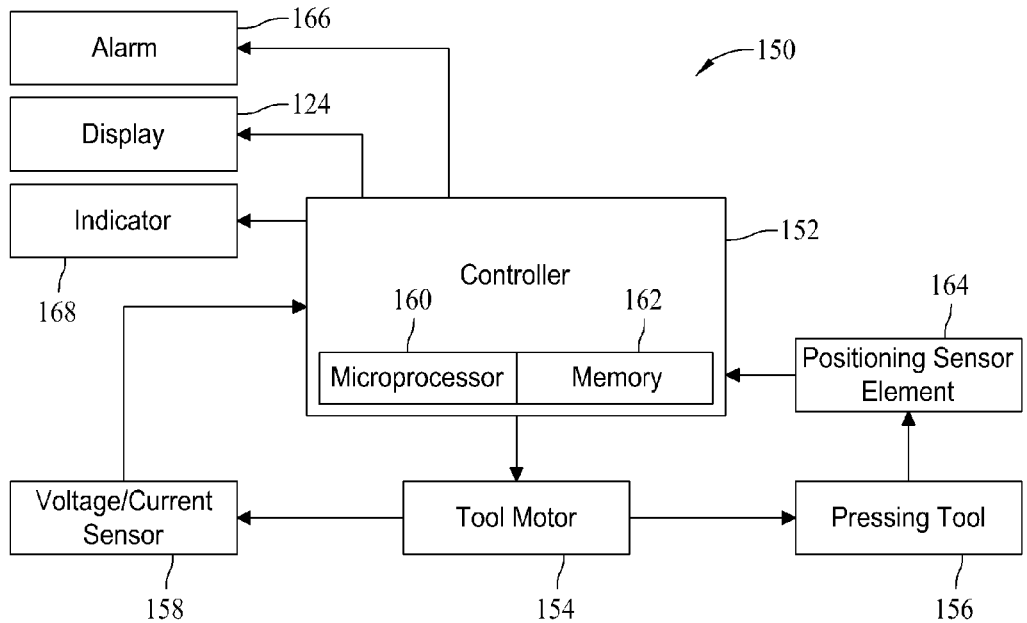
FIG. 2 is a block diagram of a first exemplary control system for the machine shown in FIG. 1.

FIG. 2 is a block diagram of a first exemplary control system 150 that may be used with the machine 100 for more optimal use and control of the machine 100 to change tires. As shown in the embodiment of FIG. 2, the control system 150 generally includes a controller 152, an actuator in the form of an electric motor 154 for moving a component such as a tool 156, and an electrical sensor 158 monitoring an electrical parameter, for example, voltage or current, associated with the motor 154. An increase in voltage or current is an indication that force exerted by the tool 156 is also increasing. Likewise, a decrease in voltage or current is an indication that the force exerted by the tool 156 is decreasing. This relationship between voltage and current and force is known or can be determined for any given motor 154 and can therefore be used to determine not only an increase or decrease in force but also the amount of force. Measuring an electrical parameter such as current or voltage provides the tire changer machine 100 with tactile feedback on how much force is being applied by the tire changer device. Other electrical parameters can be sensed and monitored using known sensors to provide alternative feedback signals indicative of force, such as capacitance, inductance, resistance or magnetic properties.

While a single motor 154 and electrical sensor 158 is illustrated, it is recognized that multiple actuator motors and multiple electrical sensors may be provided in further embodiments wherein independent movement of tools or multiple degrees of freedom of movement are desirable for one or more tools. For example, two actuators may be provided each moving the tool 156 in different directions or in different ways and a sensor may be provided to detect force associated with the different directions or manners of movement.

A variety of electrical motors are available for use as the electric motor 154 to move and position the tools relative to the wheel rim 106 and tire 108, as well as to provide appropriate force to install and remove a tire 108 from the wheel rim 106 (FIGS. 1*a*, 1*b* and 1*c*). Gearsets, cam followers, and other linkages may be provided to produce desired motion of tool 156 when the motor 154 is energized by the controller 152.

The electrical sensor 158 monitors electrical parameters associated with the motor 154 and provides a signal input to the controller 152 for feedback control purposes, detection of error conditions, and for optimization of the machine for an operator. A variety of voltage and current sensors, as well as other types of electrical sensors for monitoring other electrical parameters and characteristics, are known and commercially available from a variety of manufacturers, any of which may be used to provide a feedback signal input to the controller 152 that is indicative of the load on the motor 154 in use.

The tool 156 may correspond to any of the tools 114, 116 and 117 shown in FIGS. 1*a* through 1*c*, or to still other tools provided on the tire changing machine 100. The controller 152, in response to the feedback signal from the sensor 158, operates the motor 154 in the manner explained below to avoid undesirable operating conditions. The motor 154, in turn, advances or withdraws the tool 156 toward and away from the wheel rim 106 and tire 108 (i.e., in the direction of arrows B and C in FIG. 1*b*).

The controller 152 may reside in the control unit 120 (FIG. 1*a*) or at another location, and may be the same or different from the main or master controller for the machine 100. That is, the controller 152 may be a dedicated controller for the tool 156, or the functions of the controller 152 may be integrated or combined with another controller in the machine 100.

In various embodiments, the controller 152 may be for example, a microcomputer, a programmable logic controller, or other processor-based device. Accordingly, the controller 152 may include a microprocessor 160 and a memory 162 for storing instructions, control algorithms and other information as required to function in the manner explained below. The controller memory 162 may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the controller 152 with equal effect to serve similar objectives. For example, a supercapacitor may be provided to give the controller time to store procedure sensitive data such as the current state in a software based state machine in the event of power loss. Other elements such as line filters and capacitors for filtering noisy power may be included. Disk storage such as a CD-ROM, DVD, or hard disk may be provided for storage of various tire profiles that may be recalled to optimize the tire mount or demount process. The tire profiles may include detailed data regarding dimensional aspects of tires to be changed and other information concerning the tires that may be useful and beneficial to the machine operator or the control system as explained below.

A positioning element 164 optionally may be included as well and provides a feedback signal to the controller 152 that is indicative of the position of the tool 156. The positioning element 164 may be a position encoder or other sensor, or may include machine vision components and the like familiar to those in the art. When so provided, the control system 150 can monitor position and force associated with the tool 156, and can compare detected position and force conditions to confirm correct operation is taking place or detect error conditions and take appropriate action to prevent undesirable consequences.

The positioning element 164 is particularly beneficial when the tool 156 corresponds to the bead roller tool 116 (FIGS. 1*b* and 1*c*) as it is driven first in the direction of arrow B (FIG. 1*b*) and then in the direction of arrow C (FIG. 1*b*), or alternatively in both the directions of arrows B and C at once, during tire changing operations to fully remove the tire bead 118 (FIG. 1*c*) from its seated position on the wheel rim 106. After the tire bead 118 has been fully removed from its seated position, the tool 116 (corresponding to the tool 156 in FIG. 2) is then raised in a direction parallel to the wheel axis 112 in a direction opposite to arrow C (FIG. 1*b*), in order to remove it from the wheel rim/tire work area. Since the tool 116 has been moved toward the wheel rim 106 in the direction of arrow C, the roller 116 would undesirably contact the wheel rim 106 if the roller were simply raised straight up. By monitoring the position of the tool 156 (corresponding to the tool 116 in FIG. 1*b*) using the positioning element 164 it is possible to know the location at which the tool 156 must be moved away from the wheel rim 106 (in a direction opposite to arrow C in FIG. 1*b*) to prevent tool-to-wheel rim contact, and the controller 152 can automatically undertake returning the tool 156 back to a home position and remove any opportunity for mistake by the human operator of the machine 100. As the tool 156 is returned, force and position are monitored for abnormal behavior. For instance, if the force for the tool 156 increases and the position change for tool 156 unexpectedly slows down, or even stops, the tool 156 might be prevented from moving because it is caught on the tire and/or rim. Once such an abnormality is detected, appropriate responsive action may be taken in response to unexpected or abnormal behavior of the tool 156 in use. Examples of responsive action include, but are not limited to, providing a warning to the operator, discontinuing movement of the tool 156, or repositioning of the tool 156 to try get around whatever is preventing the tool 156 from returning to the home position.

An alarm element 166 may be connected to the controller 152, and in various embodiments the alarm element may be audio, tactile and/or visual in nature, to alert a machine operator of problematic operating conditions of the machine 100. Once an alarm condition is detected, instructions or explanation may be presented to the machine operator via the optional display 124, a pre-recorded audio message, or by other means so that the operator can take appropriate measures to mitigate negative consequences.

As explained in further detail below, actions taken by the controller 152 may disable or de-energize the motor 154 when a predetermined maximum force limit is experienced, may disable or de-energize the motor 154 when expected movement of the tool 156 does not occur, or may control the motor 154 in anticipation of or response to a sudden drop in resistance by the tire 108 when the seal with the wheel rim 106 is finally broken.

An optional indicator 168 may also be provided for the machine operator's benefit to provide real time informational feedback for normal or expected operating conditions of the machine during a tire change procedure. As such, and in contrast to the alarm element 166, the indicator 168 provides operator feedback indication concerning successful, error free operating conditions as detected by the controller 152. That is, the indicator 168 may provide confirmation that the force feedback signal(s) are in an acceptable state and the machine and its tools is being used properly. The indicator 168 may provide step by step, real time feedback to the machine operator concerning the acceptable state of the machine. The indicator 168, like the alarm element, may be audio, tactile and/or visual in nature, to indicate satisfactory use or operation of the machine. Instructions or explanation may be presented to the machine operator via the optional display 124, a pre-recorded audio message, or by other means to indicate steps successfully performed in a tire change procedure, and optionally prompt the operator to perform next steps in the procedure.

It is understood that the functionality of the alarm element 166 and the indication element 168 could be combined into a single device if desired as long as different audio, tactile and/or visual cues were provided to distinguish positive operation of the machine without error and negative operation of the machine with error. Alternatively, the alarm element 166 and the indication element 168 may be separate devices in separate locations on the machine to aid the operator in rapidly distinguishing positive and negative feedback from the controller 152. It is also contemplated that if the optional display 124 is provided, it may obviate any need for separately provided alarm elements and indicator elements as both alarm and indication features could be presented via the display 124.

Figure 3:
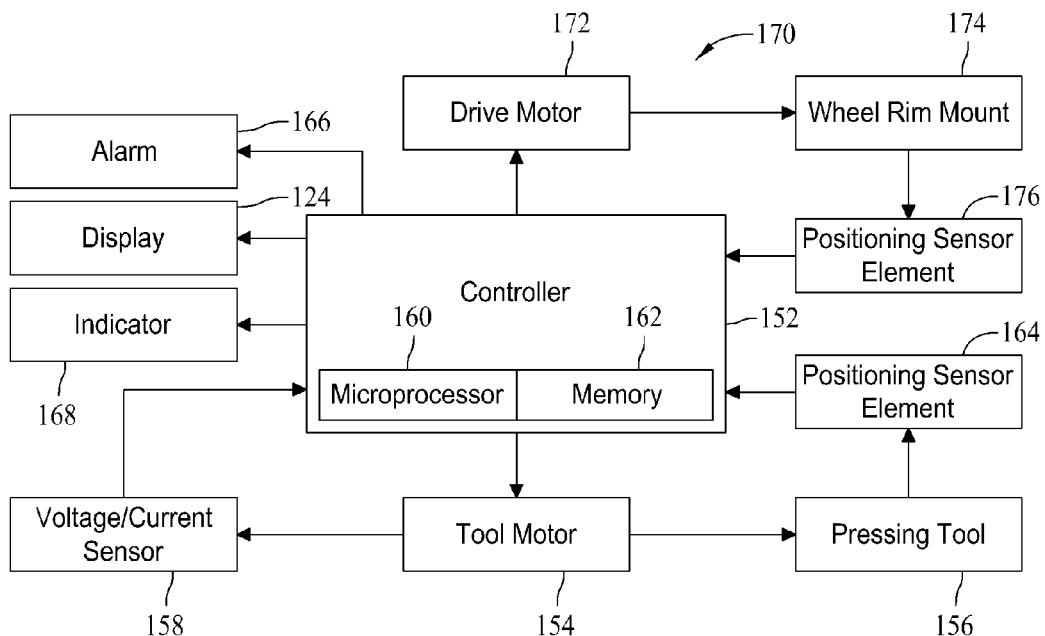
FIG. 3 is a block diagram of a second exemplary control system for the machine shown in FIG. 1.

FIG. 3 is a block diagram of a second exemplary control system 170 that may be used with the machine 100 (FIGS. 1a, 1b, 1c) for more optimal use and control of the machine 100 to change tires. As shown in the embodiment of FIG. 3, the control system 170 is similar in some aspects to the control system 150 shown in FIG. 2. Like the control system 150, the control system 170 includes the controller 152 coupled to a motor 154 that moves the tool 156. The voltage or current sensor 158 senses the amount of force exerted by the motor 154 and feeds that information back to the controller 152. The position sensor element 164 provides the controller 152 with position information for the tool 156.

Unlike the control system 150, the control system 170 further includes a portion of the machine drive assembly 104, such as a drive motor 172 (also shown in FIG. 1c) for controllably rotating a wheel rim mount 174 that clamps or otherwise retains the wheel rim 106 (FIG. 1c) as the machine drive assembly 104 rotates the wheel rim 106 about the drive axis 112 (FIG. 1a) in a tire changing procedure. Various wheel rim mounts 174 are known that engage the wheel rim 106 in various ways, any of which may be used in exemplary embodiments. The wheel rim mount 174 is mounted stationary to the drive assembly 104 and rotates with the drive assembly 104. The drive assembly 104 may include a center post or shaft provided with the wheel rim mount 174. As another illustrative example, the drive assembly may alternatively include a rotating turntable or spindle with the wheel rim mount 174 provided thereon.

As shown in FIG. 3, the control system 170 further includes a position sensor element 176 (also shown in FIG. 1c) for providing the control system 170 with a wheel mount rotation position. Thus, the controller 152 may receive feedback indicating the degree of rotation of the wheel rim mount 174 by the drive assembly, which is driven by the drive motor 172.

Thus the control system 170 utilizes numerous tactile feedback control inputs from numerous reference points as the tire changing machine is used, including feedback to the controller 152 concerning a rotational position of the wheel rim mount 174 provided by the position sensor 176, feedback to the controller 152 concerning tool force provided by the electrical sensor 158, and feedback to the controller 152 concerning tool position information provided by the sensor 164. The controller 152 uses this tactile feedback information to control the tool motor 154, the drive motor 172, the optional display 124, the optional alarm element 166, and the optional indicator 168.

Figure 4:
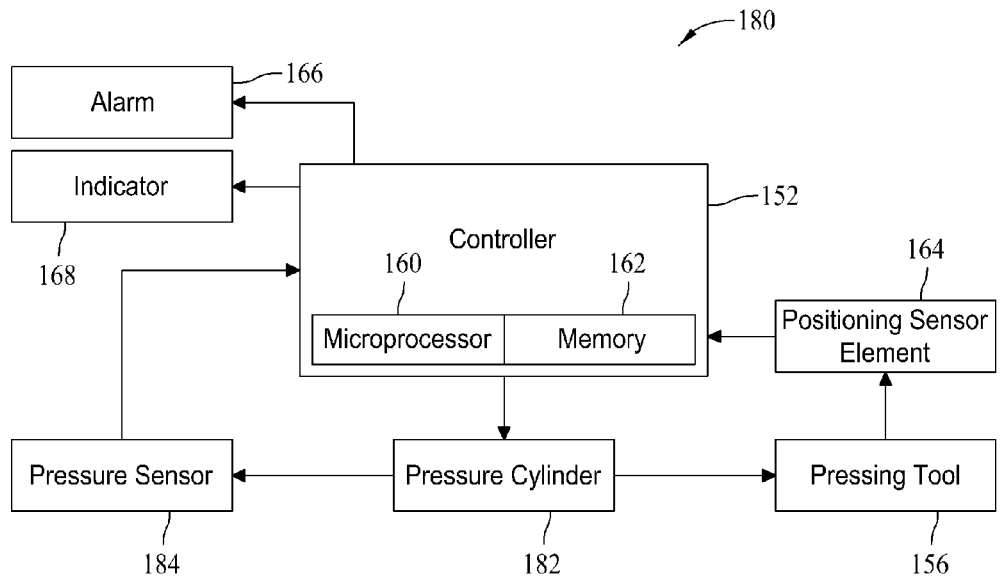
FIG. 4 is a block diagram of a third exemplary control system for the machine shown in FIG. 1.

FIG. 4 is a block diagram of a third exemplary control system 180 that may be used with the machine 100 (FIGS. 1a, 1b, 1c) for more optimal use and control of the machine 100 to change tires. As shown in the embodiment of FIG. 4, the control system 180 is similar in some aspects to the control system 150 (FIG. 2), but uses a different type of tool actuator and different forms of tactile feedback.

The control system 180 includes the controller 152 coupled to a tool actuator in the form of a pressure cylinder 182 that houses a reciprocating piston or ram for moving the tool 156, and a pressure sensor 184 monitoring a fluid pressure associated with the pressure cylinder 182. In an exemplary embodiment, fluid pressure associated with the cylinder 182 can be sensed electronically with an inline pressure sensor 184. As fluid pressure increases or decreases, a corresponding signal from the pressure sensor 184 is communicated to the controller 152 to provide tactile feedback.

In different embodiments, the pressure cylinder 182 may be hydraulically actuated or pneumatically actuated, with the pressure sensor 184 providing a feedback signal to the controller 152 that is indicative of the force or pressure exerted by the pressure cylinder 182 with the tool 156. While a single pressure cylinder 182 and sensor 184 is illustrated, it is recognized that multiple cylinders and multiple sensors may be provided in further embodiments wherein independent movement of tools or multiple degrees of freedom of movement are desirable for one or more tools. The positioning element 164 and the alarm element 166 or the indicator 168 may also optionally be provided. The controller 152 operatively responds to this tactile feedback information as further described below.

Figure 5:
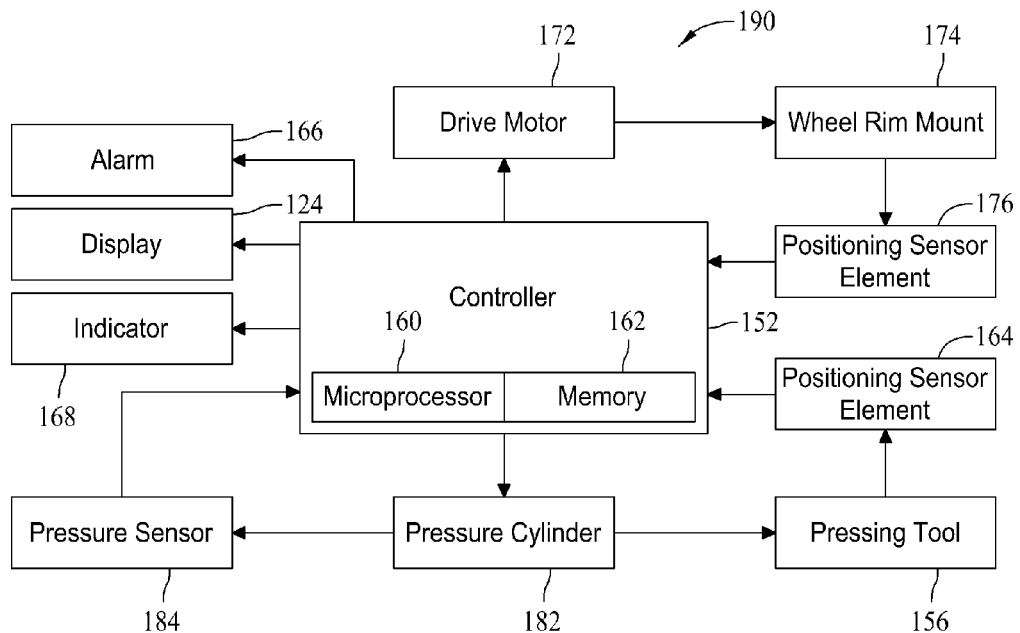
FIG. 5 is a block diagram of a fourth exemplary control system for the machine shown in FIG. 1.

FIG. 5 is a block diagram of a fourth exemplary control system 190 that may be used with the machine 100 (FIGS. 1a, 1b, 1c) for more optimal use and control of the machine 100 to change tires. As shown in the embodiment of FIG. 5, the control system 190 is similar in some aspects to the control system 180 shown in FIG. 4. Like the control system 180, the control system 190 includes the controller 152 coupled to an actuator in the form of a pressure cylinder 182 that houses a reciprocating piston or ram for moving the tool 156, and a pressure sensor 184 monitoring a fluid pressure associated with the pressure cylinder 182. Fluid pressure associated with the cylinder 182 can be sensed electronically with an inline pressure sensor 184.

As fluid pressure increases or decreases, a corresponding signal from the pressure sensor 184 is communicated to the controller 152 to provide tactile feedback to the controller 152. A position sensor element 164 provides the controller 152 with position information for the tool 156.

The control system 190 further includes the motor 172 for controllably rotating the wheel rim mount 174. The control system 190 also includes a position sensor element 176 for providing the control system 190 with wheel rim mount position. The wheel rim mount 174 and the position sensor element 176 for the wheel rim mount 174 are described above in reference to FIG. 3.

Tactile feedback information concerning a position of the wheel rim mount provided by the sensor element 176, sensed force of the tool 156 provided by the pressure sensor 184, and position information for the tool 156 provided by the sensor 164 are each provided to the controller 152. The controller 152 uses this tactile feedback information to control the tool pressure cylinder 182, the drive motor 172, optional display 124, and optional alarm element 166 and indicator 168 as further described below.

Figure 6:
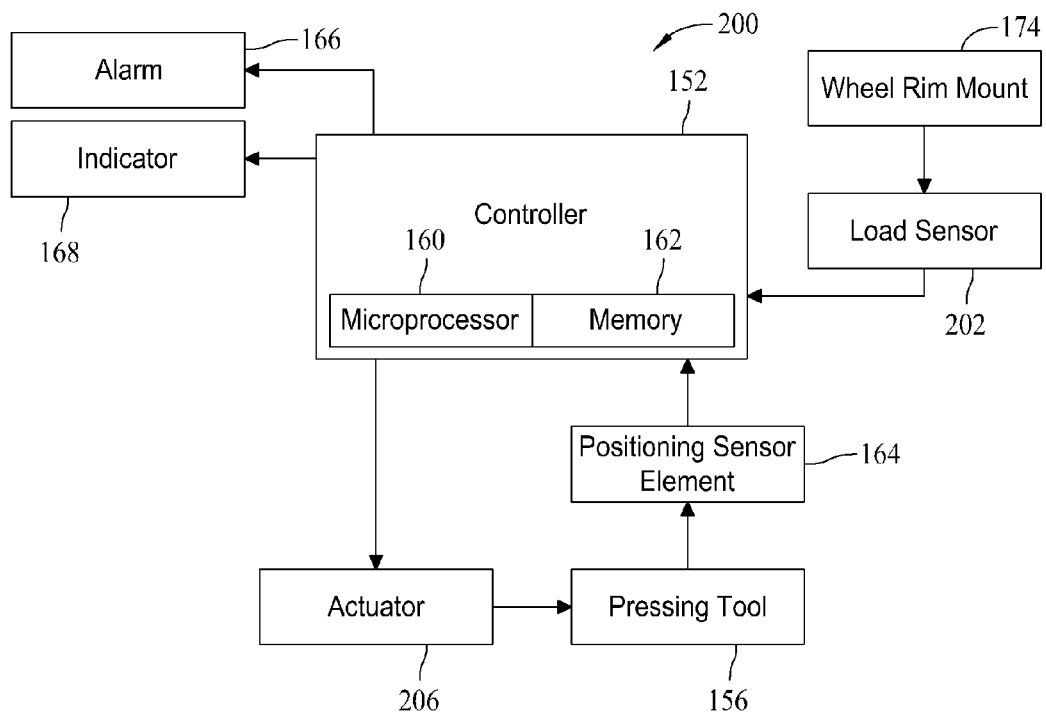
FIG. 6 is a block diagram of a fifth exemplary control system for the machine shown in FIG. 1.

FIG. 6 is a block diagram of a fifth exemplary control system 200 that may be used with the machine 100 (FIGS. 1a, 1b, 1c) for more optimal use and control of the machine 100 to change tires. As shown in the embodiment of FIG. 6, the control system 200 is similar in some aspects to the control systems described above.

The control system 200 includes the controller 152 receiving an input signal from a load sensor 202 associated with the wheel rim mount 174 of the machine 100. In such an embodiment, an indirect force measurement is obtained by monitoring a reaction force exerted by the wheel rim 106 and tire 108 to the wheel mount 174. A tool actuator 206, which may be any of the actuators described herein, is operationally responsive to the controller 152 and moves the tool 156 toward or away from the wheel rim 106 and the tire 108. When the tool 156 is utilized in tire changing operations, reaction forces are experienced at the wheel rim mount 174 that may be monitored with the load sensor 202.

As an illustrative example, the wheel rim mount 174 may be provided on a center post or shaft of the drive assembly 104 (FIG. 1a) and the load sensor 202 may be a load sensing bearing associated with the center post of the shaft. One such load sensing bearing suitable for use as the load sensor 202 is manufactured by SKF for vehicles where the bearing supports the weight of a vehicle and yet measures the force exerted on the bearing in 5 degrees of freedom. Another suitable load sensor 202 is a bearing ring available from Kistler Instrumente AG for measuring cutting forces on milling machines and other industrial equipment.

As another illustrative example, the wheel rim mount 174 may be provided on a rotating turntable or spindle, and the load sensor 202 may be a force sensing bearing ring. Suitable force sensing rings are also made by Kistler.

The load sensor 202 provides a feedback signal to the controller 152 that is indicative of the force or pressure exerted by the tool actuator 206 and the tool 156. While a single tool actuator 206 and a single load sensor 202 is illustrated, it is recognized that multiple actuators and more than one load sensor may be provided in further embodiments wherein independent movement of tools or multiple degrees of freedom of movement are desirable for one or more tools. The positioning element 164 and the alarm element 166 and indicator 168 may also optionally be provided.

Figure 7:
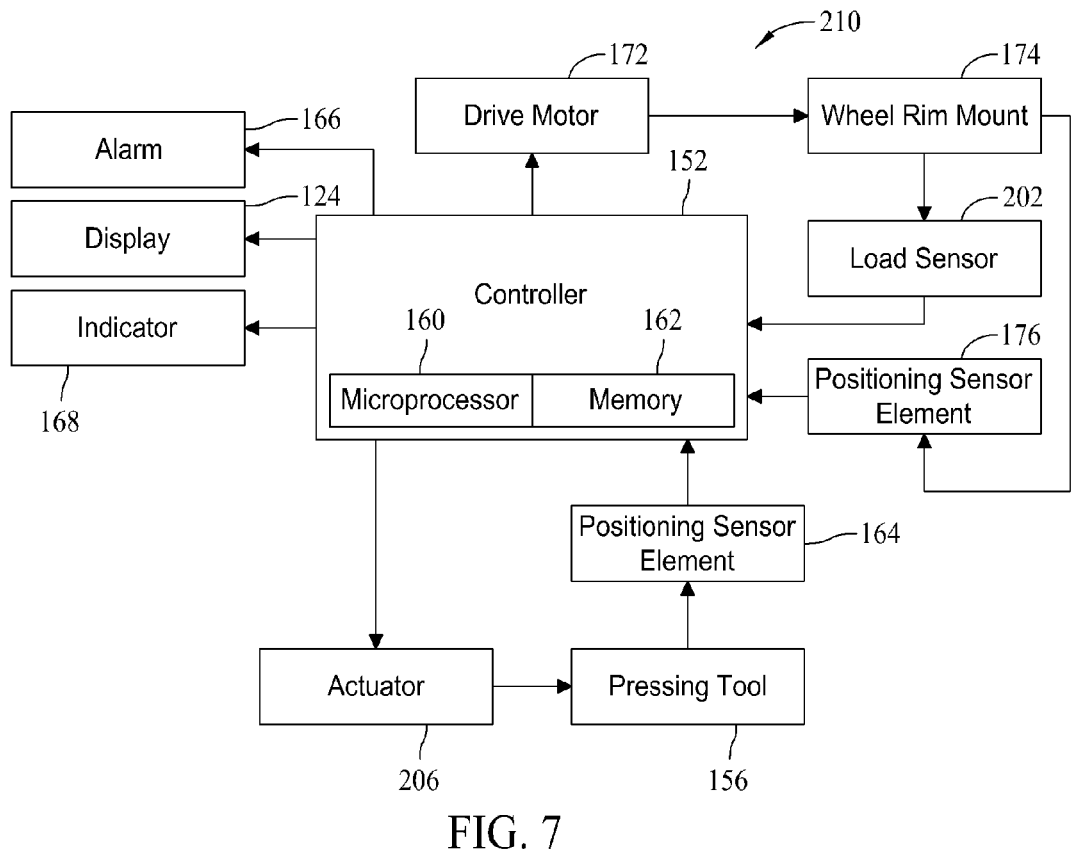
FIG. 7 is a block diagram of a sixth exemplary control system for the machine shown in FIG. 1.

FIG. 7 is a block diagram of a sixth exemplary control system 210 that may be used with the machine 100 (FIGS. 1a, 1b, 1c) for more optimal use and control of the machine 100 to change tires. As shown in the embodiment of FIG. 7, the control system 210 is similar in some aspects to the control system 200 described above.

The control system 210 includes the controller 152 receiving an input signal from the load sensor 202 associated with a wheel rim mount 174 of the machine 100. As described above, an indirect force measurement is obtained by monitoring a reaction force exerted by the wheel rim 106 and tire 108 to the wheel rim mount 174. A tool actuator 206, which may be any of the actuators described above, is operationally responsive to the controller 152 and moves the tool 156 toward or away from the wheel rim 106 and the tire 108. When the tool 156 is utilized in tire changing operations, reaction forces are experienced at the wheel rim mount 174 that may be monitored with the load sensor 202.

As shown in FIG. 7, the control system 210 further includes the drive motor 172 for controllably rotating the wheel rim mount 174. The control system 210 also includes the position sensor element 176 for providing the control system 210 with wheel rim mount position.

Various types of tactile feedback information may therefore be fed back to the controller 152, including information concerning a position of the wheel rim mount 174 provided by the position sensor 176, information concerning tool force provided by the load sensor 202, and information concerning a position of the tool 156 provided by the position sensor 164. The controller 152 uses this tactile feedback information to control the tool actuator 206, the drive motor 172, optional display 124, and optional alarm element 166 and indicator 168 as explained below.

Figure 8:
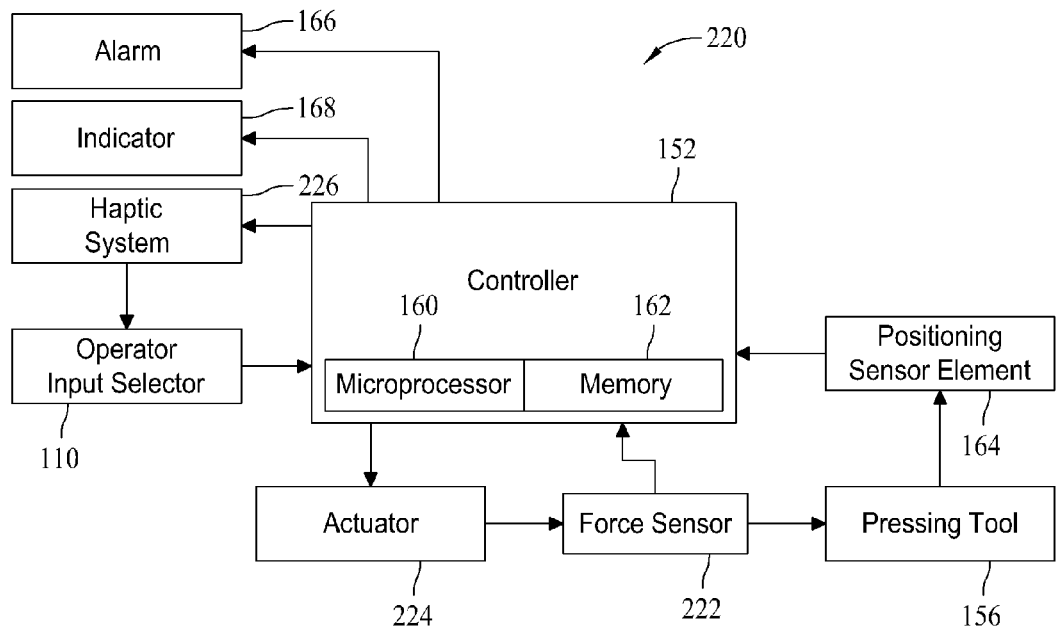
FIG. 8 is a block diagram of a seventh exemplary control system for the machine shown in FIG. 1.

FIG. 8 is a block diagram of a seventh exemplary control system 220 that may be used with the machine 100 (FIGS. 1a, 1b, 1c) for more optimal use and control of the machine 100 to change tires. As shown in the embodiment of FIG. 8, the control system 220 is similar in some aspects to the control systems 150 described above.

The control system 220 includes the controller 152 receiving an input signal from a force sensor 222 associated with a tool actuator 224 carrying the tool 156, in addition to the position sensor 164. In various embodiments, the actuator 224 may be any of the actuators described above, or still other actuators known in the art. The force sensor 222 may be any of the sensors previously described, or additionally may be a flexible, resistive sensor such as a Flexiforce™ sensor by Tekscan, a piezo sensor, a strain gage load cell, or still other sensors familiar to those in the art.

Recognizing that the tire changing machine 100 (FIGS. 1a, 1b, 1c) typically involves a human operator moving the tool 156 to a particular location on the assembly of the wheel rim 106 and tire 108 (FIG. 1a), a haptic system 226 is further provided and is in communication with the controller 152 and an operator input selector 110 for operating the actuator 224 associated with the tool 156. The haptic system 226 is operationally responsive to the controller 152 and is activated by the controller 152 in response to feedback signals from the force sensor 222 and positioning sensor 164. The haptic system 226 provides sensory feedback to the human operator to provide the operator some guidance regarding how much force to apply at any given point in the tire mount or demount process. In contemplated embodiments, the haptic system 226 could be implemented on an input selector 110 such as a foot pedal, joy stick, lever, button, switch or other element operable with the operator's hands or feet, or that otherwise interfaces with the operator's sense of touch.

Various types of haptic devices and systems are known and may be used, with the haptic system 226 changing the behavior of the input selector 110 to provide tactile feedback to the human user that engages the input selector 110. In an exemplary embodiment, the haptic system 226 may vary the resistance of the input selector 110 as the operator attempts to manipulate it to move the tool 156. Alternatively the haptic system 226 may cause the input selector 110 to shake and/or vibrate as a warning to the human operator that sufficient force has been applied with the tool 156 and to use appropriate caution in applying further force.

In one example of the control system 220 in use, once the human operator is satisfied with the location of the bead breaker, he or she starts applying force to the tire by manipulating the input selector 110, thereby causing the controller 152 to operate the actuator 224 to move the tool 156 to engage the tire 108 on the machine 100. If the resultant force applied to the tire 108 by the tool 156, as detected by the force sensor 222, continues to increase with little or no movement of the tool 156, as determined by the positioning element 164, the haptic system is activated by the controller 152 so that the effort the human operator must exert at the input selector 110 to continue applying more pressure also increases.

On the other hand, if the force applied by the operator via the input selector 110 results in the tire bead 118 (FIG. 1c) moving from the bead seat of the wheel rim 106 then the haptic system 226 is operated by the controller 152 to decrease an amount of effort the operator must exert to continue to operate the tool 156.

If the tool 156 has moved the tire bead from the bead seat and the operator continues to apply pressure via the input selector 110, resulting in rapid movement of the tool 156, the haptic system 226 is operated by the controller 152 to create more feedback to the operator resulting in the operator having to exert more effort to increase pressure. The effect of the haptic system 226 opposing efforts of the operator serves to prevent the operator from mistakenly applying an inappropriate amount of force that may result in damage or loss of control of the tool 156 during one or more portions of a tire mounting or demounting operation.

As another example of the control system 220 in use, the haptic system 226 could make the input selector shake or vibrate when the tire bead 118 has been moved from the bead seat of the rim 106. Such shaking or vibration is an indication to the operator that additional force application with the tool 156 is inadvisable, and can coach the operator to successfully and properly use the tool 156. For example, the operator can take appropriate care not to break any wheel sensor such as tire pressure (TPMS) sensors that may be positioned on the inside cavity of the wheel rim/tire assembly by reducing the applied force as a result of the haptic system 226 giving feedback to the operator that excessive force is being applied.

In still other embodiments, the haptic system 226 may also include more subtle feedback features for the benefit of the operator such as providing one or more lamps or other illumination element with adjustable intensity. In such an embodiment, the controller 152 may adjust or change the brightness of emitted light to represent the applied force to the machine operator. In such an embodiment, the light may become brighter as more force is applied and dimmer as less is applied. As another example, one or more light elements could selectively be turned on or off without adjusting the intensity of illumination. Similar variations are possible using different sounds or sounds of varying intensity instead of light. Combinations of sounds and light are likewise possible.

Figure 9:
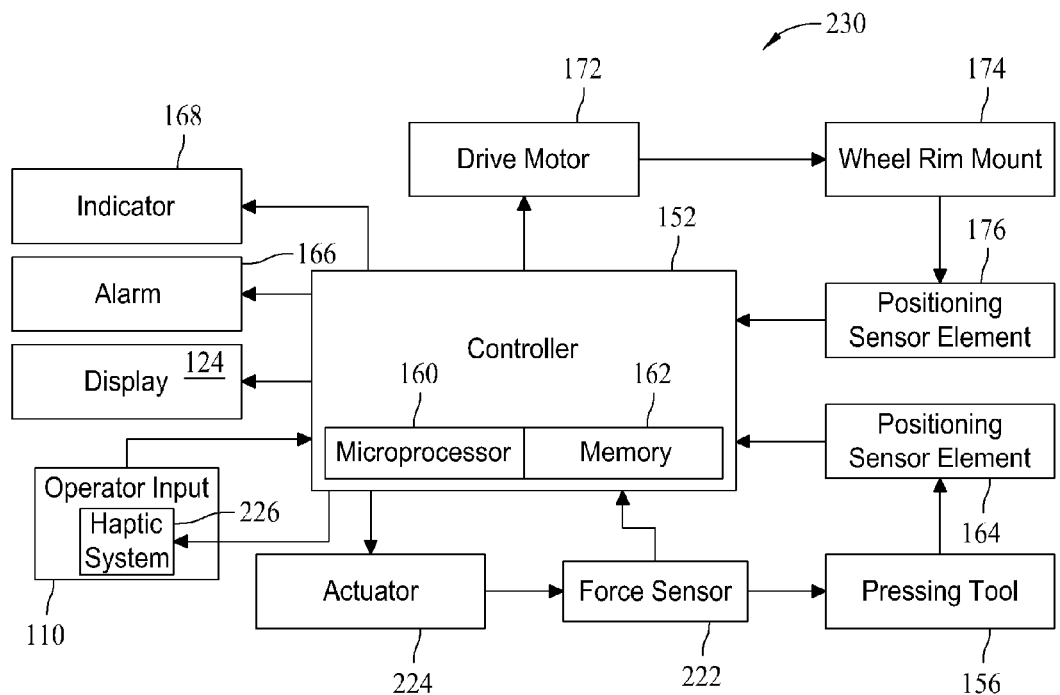
FIG. 9 is a block diagram of an eighth exemplary control system for the machine shown in FIG. 1.

FIG. 9 is a block diagram of an eighth exemplary control system 230 that may be used with the machine 100 (FIGS. 1a, 1b, 1c) for more optimal use and control of the machine 100 to change tires. As shown in the embodiment of FIG. 9, the control system 230 is similar in some aspects to the control systems described above.

The control system 230 includes the controller 152 receiving an input signal from a force sensor 222 associated with a tool actuator 224 carrying the tool 156. In various embodiments, the actuator 224 may be any of the actuators described above, or still other actuators known in the art. The control system 230 also includes the drive motor 172 receiving input from controller 152 and used for controlling the rotational position of the wheel rim mount 174. The wheel rim mount position sensor 176 is also included to provide controller 152 with input indicating the rotational position of the wheel rim.

The haptic system 226 as shown is part of the operator input 110 and is operationally responsive to controller 152. The controller 152 activates the haptic system 226 in different ways depending on inputs the controller 152 receives from the wheel rim mount position sensor 176, tool position sensor 164, and actuator force sensor 222.

While various control systems are illustrated in FIGS. 2-9, it is contemplated that aspects of the control systems described could be selectively combined to provide still other variations of control systems. For example, the haptic system 226 described in relationship to FIGS. 8 and 9 could be provided in the control systems shown in FIGS. 2-7. As another example, it is contemplated that the controller 152 could monitor and appropriately control several different types of actuators (e.g., electric motors or pneumatic or hydraulic cylinders) using feedback signals from different types of sensors. The exemplary control systems are scalable to accommodate various numbers of tire changing tools, and sensors may be provided in redundant fashion (e.g., sensors may be provided that are associated with the actuators of the tire changing tools and the wheel rim mount) to provide fall back features to ensure failsafe operation in the event that one of the sensors malfunctions.

Figure 10:
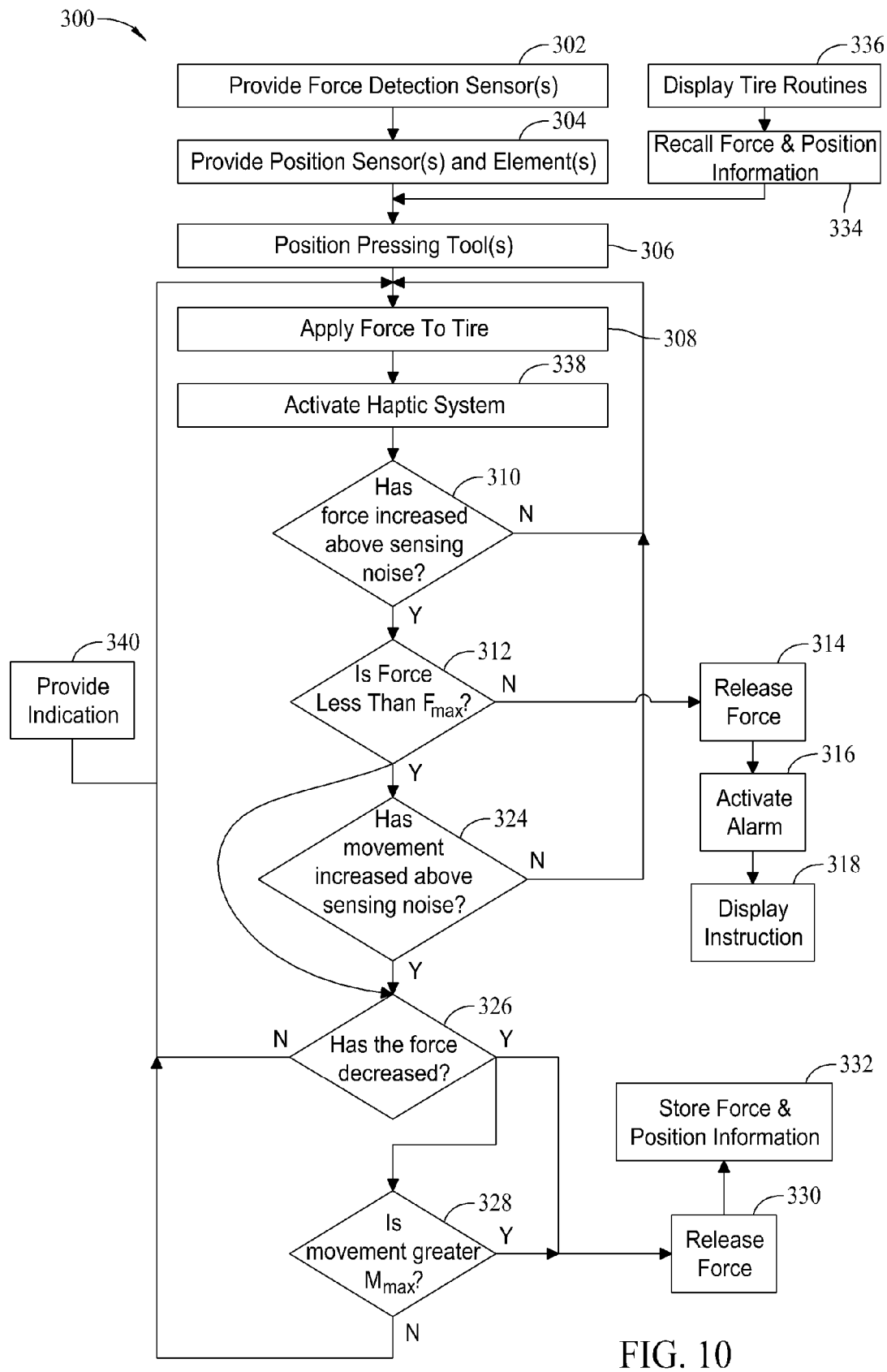

FIG. 10 illustrates a method flowchart of exemplary processes 300 utilized in the machine 100 (FIGS. 1a, 1b, 1c) to change tires 108. FIG. 10 is provided as a non-limiting example of various processes that can be implemented with and executed by the controller 152 in the control systems shown in FIGS. 2-9.

As shown in FIG. 10, the method 300 includes providing the force detection sensors at step 302, such as any of the sensors described above or other known sensors. Step 302 may also include connecting the sensors provided to the controller 152 in the machine 100. The method also optionally includes, as shown at step 304, providing position sensors and elements 304 such as those described above and connecting them to the controller 152 in the machine 100.

The machine operator may commence a tire changing operation by loading a wheel rim 106 and tire 108 onto the machine 100 and appropriately securing the wheel rim to the machine. The operator may then at step 306 position the tools 114, 116 and 117 to the locations that visually appear to be the correct locations to the operator. The operator then begins to apply force to the tire at step 308, using the appropriate input selector 110 (FIG. 1a) of the machine, to engage the tools 114 and/or 116 with the tire to install or remove the tire from the wheel rim. Optionally, the machine 100 can be started such that the procedure progresses automatically using the sensing elements to control the procedure.

When the operator initiates the application of force in step 308, the controller 152 begins to monitor at step 310 the application of force via the feedback signals from the sensor or sensors provided in step 302. The controller 152 determines at step 312, based on the force feedback signals from the sensors, whether the force is less than a predetermined maximum force ($F_{max}$) for the tire changing operation. $F_{max}$ may optionally be recalled from the controller memory 152, for example, based on a parameter of the tire 108, such as an aspect ratio entered or selected by an operator using the input device 126 (FIG. 1a) of the machine 100. $F_{max}$ may be a theoretical or empirically determined threshold force limit that corresponds to a sufficient, but not excessive, force for normal tire changing operations. If the force limit $F_{max}$ is exceeded, the controller 152 may infer that the tool has been inadvertently and undesirably placed in contact with the rigid wheel rim 106 instead of the tire 108. The force limit $F_{max}$ is preferably selected to be a level generally well below a level that would cause the wheel rim 106 to bend or deform.

If the force limit $F_{max}$ is determined to be exceeded at step 312, the controller operates, or fails to continue to operate the actuators, to release the applied force at step 314. For example, in an embodiment involving a pneumatic actuator, an air valve may be utilized to release the air pressure and associated force. A release valve could likewise be utilized in an embodiment involving a hydraulic actuator to release the applied force. In an embodiment having an electric motor actuator, the controller 152 could initiate an instant decrease in voltage or current to release the force applied by the motor. By releasing the force at step 314, it can be ensured that the wheel rim 106 will not be damaged, even if a tool is incorrectly placed in contact with it.

After applied force is released at step 314, the controller 152 may conclude that an error condition exists and optionally activate an alarm at step 316, such as an audio or visual alarm, to alert the machine operator of an error condition. In response, the operator may take appropriate action to correct the error condition, including but not limited to backing off the tools and repositioning them. Optionally, in an embodiment wherein the machine 100 includes a display 124, the controller 152 may present or display a message or instruction at step 318 to the operator explaining that the force limit had been reached and to check or verify the proper placement of the tool before proceeding.

In an alternative embodiment, a rate of increase of the applied force can also be monitored to provide a means to evaluate whether the tool is engaged at the proper location of the tire. It is anticipated that the applied force would increase much more rapidly when the tool engages the wheel rim (an error condition) as opposed to the tire (a normal and proper condition), and such increases may be empirically determined to distinguish a normal and proper condition from an error condition.

Optionally, and as indicated in step 324, the controller 152 may also monitor the position or movement of the tool, and using the feedback signal from the sensors provided in step 304, determine whether an expected amount or degree of movement of the tool has resulted at step 324. In a normal tire changing operation when the tools are correctly located on the tire, one would expect to see some deflection of the tool as the applied force is increased. If the force is observed to be increasing, but expected movement of the tool has not occurred, it is probable that the tool is engaging the wheel rim and not the tire, and the controller 152 may accordingly release the applied force at step 314 if the applied force is greater than $F_{max}$, activate an optional alarm at step 316, and optionally display appropriate instruction to the operator at step 318.

As indicated at step 326, the controller 152 further determines whether a drop in monitored force has occurred. If so, the tire bead seal has likely been broken and further application of force is unnecessary. That is, the force sensors allow the controller 152 to determine when bead breaking is complete. During normal bead breaking, the force applied to the tire 108 will remain substantially consistent. If this force suddenly drops off it can be assumed that the bead breaking operation is complete. The controller 152 may lower the applied force at this point to prevent the tool from rapidly moving into the cavity between the wheel rim 106 and the tire 108. Any of the techniques previously described for step 314 may be used to release the force at step 330. The release of force or pressure at this point generally prevents inadvertent damage to tire pressure sensors or other elements inside the cavity of the tire and wheel rim. Also, a degree of operator safety is provided by releasing the force or pressure associated with the tool once the tire bead seal is broken.

If expected movement of the tool is optionally being monitored and there has been a decrease in the applied force at step 326, the controller 152 determines at step 328 if the movement has been enough to ensure that the entire bead is completely moved from the bead seat. If there has been enough movement then the force is released at step 330. If there has not been enough movement then the cycle of force and monitoring continues until there is enough movement sensed by the controller 152.

The force monitoring at steps 310 and 312 may be beneficial even after the tire bead seal is broken. For example, if after the tool moves the tire a certain distance and the monitored force starts to increase again the controller 152 can again immediately release and lower the applied force. An optional alarm or warning could be displayed to an operator as a result of such a second increase in force. The second increase in force would likely be the result of the tool contacting a wheel sensor such as a tire pressure (TPMS) sensor or other feature of the tire that could be damaged by the tool. By releasing applied force, such damage can be avoided.

The controller 152 may record or save in the controller memory or other location specific operational force and position parameters, for example, at optional step 332 that corresponds to a successful tire change operation wherein detected forces and/or positions are acceptable or below the predetermined force and position limits for all aspects of the procedure. That is, operational force and position profiles for the tools or other machine components may be created by one or more machine operators and be associated with a tire and wheel rim identifier. The successful force and position profiles may therefore serve as baselines for control and evaluation of the same procedure performed on a wheel rim and tire combination of the same type. In one embodiment, both force data and corresponding position data may be stored in the profile. In another embodiment, only the position data is stored as it would be expected that execution of the position data would generate nearly the same force data when re-executed on a similar tire and wheel rim combination. In addition, the machine operator may enter tire parameters such as the aspect ratio of the tire, a rim bead diameter (nominal rim diameter) and/or outside diameter. Such tire parameters may be associated with the stored procedure data for future recall.

Saved force and/or position profiles, for example, may be recalled at optional step 334 for future use with the same or similar tire and rim combinations. Optionally, the force and position profiles may be presented or displayed to the machine operator at step 336 for his or her selection. If a tire force and position routine is selected by the operator at step 336, the controller may proceed to automatically position the tools 306 and apply force 308, all the while proceeding to monitor applied force and optionally monitor positions of the tool at steps 310, 312, 324, 326 and 328. Absent an error condition being detected, the controller 152 may complete the force and position routine without human assistance. In another embodiment, force and position profiles, or other types of profiles for one or more machine components may be pre-programmed into the machine.

It is contemplated that one or more unique operational profiles may be utilized, whether pre-programmed or saved by an operator, for distinct operation of various machine components that may be executed alone or in concert to perform a tire change procedure on the machine. Each profile may include operational data and information defining aspects to be controlled and/or monitored to perform a tire change procedure using the component. Such operational data and information for such a profile may include, for example, one or more of force, position, acceleration, torque, time and displacement data and parameters for operating the components and defining a path of motion in three dimensional space that corresponds to a tire change procedure. A rate of change of one or more, force, position, acceleration, torque, and displacement parameters may also be captured in an operational profile which the machine controller(s) can use to operate the components. It is recognized that the operational profiles may be organized and stored in various ways, including but not limited to look up tables, graphs, mathematical representation or routines that may be input to the machine controller in whole or in part for control and monitoring purposes. The operational profiles may effectively serve as templates defining baseline control and monitoring thresholds for determining acceptable or unacceptable machine operation.

In general, because of the unique operational profiles, the components are operated in a distinct or different manner depending on which of the operational profiles is selected for execution. Each operational profile may be associated with a different tire and rim combination such that the machine controls may operate the components differently for each different tire and rim combination. That is, for example, in each of the distinct profiles the components may be operated along different motion paths, may be operated at different speeds, may be operated for a given amount of time, and may be utilized to generate different amounts of force. Additionally, the operational profiles may define relatively simple or complex motion paths and application of force as appropriate. The data, parameters and information contained in each of the respective unique operational profiles is therefore different such that the starting locations, starting angles, end effector paths, speed, acceleration, time of execution and other parameters of interest are not the same. A number of unique operational profiles may be created and stored to provide optimal and customized machine operation for a great variety of wheel rim and tire combinations.

In still other contemplated embodiments, operational profiles may be stored that generate similar motion paths of components in a tire change operation, but are distinct in the amount of force utilized or the speed of operations. For example, a gentle profile, a light duty profile and a heavy duty profile may be created using otherwise similar, if not exact, motion paths of components but with different, and increasing, amounts of force for the gentle, light duty and heavy duty profiles. As another example, a slow profile, a medium profile and a fast profile may be provided that involve similar, if not exact, motion paths of the components but at different, and increasing speeds for the slow, medium and fast profiles. The machine operator may select the most appropriate profile for use in light of his or her own experience operating the machine, particular tire and rim combinations, and other factors.

Various operational profiles may be created and stored and may be run concurrently in a tire change operation. For example, one operational profile may be selected for the drive assembly and another profile may be selected for each of the tire changing tools needed to complete a tire change procedure. The drive assembly profile and the tool profile may then be run in combination by the controller. In other embodiments, the operational profiles may include parameters, data and information for controlling and monitoring the drive assembly and one or more tire changing tools, for example.

Once a number of operational profiles are saved at optional step 332, the machine 100 is capable of changing a wide variety of tires for a variety of different rims using control systems such as those described. By knowing what type of tire and rim the tire changing machine is working with, which the operator can input to the machine using the optional input device 126 (FIG. 1*a*), the tire changing machine can recall and execute the appropriate starting location, starting angle, and end effector path of one or more tools to complete the tire changing operation, while still monitoring force to confirm that they remain within acceptable limits.

Various techniques could be used to input tire and rim information to the machine. In various exemplary embodiments, the machine may read or otherwise accept data and information concerning rims and tires using bar code scanners, radio frequency identification (RFID) tags, or other known technology. In such scenarios, data and information for the tire and/or rim may be provided by the tire and/or rim manufacturer or another party and may be input to the machine using bar coded labels, RFID tags or other technology that are read by a compatible reader or scanner. Using bar codes, RFID elements and other technology, specific types of tires and rims, as well as the necessary data for the machine controls described herein, may be self-identifying to the machine as they are introduced. The machine operator need not have any specific knowledge of the tire or rim in such a scenario.

As another example, tire and rim data could be correlated with graphics, including but not limited to pictures of the tires and rims, that may serve as a basis for inputting the necessary data and information to the machine. For example, the graphics could be presented to the machine operator, via the machine or otherwise, and when the operator selects one of the graphics the data corresponding to the selected picture is used to implement the controls described herein. Using such a graphical scheme, the operator need have only general knowledge of the tire and rim to make the initial selection, and the particular data needed for the controls is then used by the machine to control and monitor the machine as described herein. The data corresponding to the selected graphic could be pre-stored on the machine or provided from another source, but generally without further action of knowledge required by the machine operator. Various color coded schemes, numeric schemes, alphanumeric schemes and other graphics schemes (e.g., shapes, symbols, etc.) are possible in graphics-based systems of this type.

In still another example, the machine operator may input specific information regarding the tire and rim, such as an aspect ratio or other information. In scenarios such as these, the machine operator is required to have some specific knowledge of the tire or rim in order to effectively utilize the machine as described herein. If not already known to the operator, the operator may look up the aspect ratio or other information from the machine memory or another source (e.g., a catalog, a reference manual, a website, a database on the machine or separately provided, or another computer system having the needed information). The aspect ratio or other information entered by the operator may be utilized to carry out the control scheme described. If the specific input information is not itself sufficient for the control needs, it can be used as a basis to retrieve other information stored on the machine or elsewhere in different embodiments, or serve as a basis for calculating or deriving other parameters necessary for the control schemes as described.

Communication links and the like may be utilized to allow the machine to retrieve and download tire and rim information from other sources if not already stored on or made available to the machine. Such communication links include, but are not limited to, local area networks (LANs) and Internet connections. In such embodiments, bidirectional communication between the machine and other computer systems is possible such that the machine may upload and download data and information to and from peripheral computer systems. Such communication capability may be used to provide new and updated control routines and procedures to the machine, as well as to provide data regarding operation of the machine for diagnostic and troubleshooting purposes, or perhaps even data and information of interest to tire and rim manufacturers.

Returning now to FIG. 10, for procedures where the human operator is part of the control loop, the optional haptic system can be activated as shown at step 338 at appropriate points to provide tactile feedback and guidance to the human operator regarding how much force is needed, not needed, or is appropriate to complete the tire changing operation. Also, at optional step 340, the controller may provide indication to the operator concerning detected states and conditions of the machine that are consistent with normal and proper use.

Figure 11:
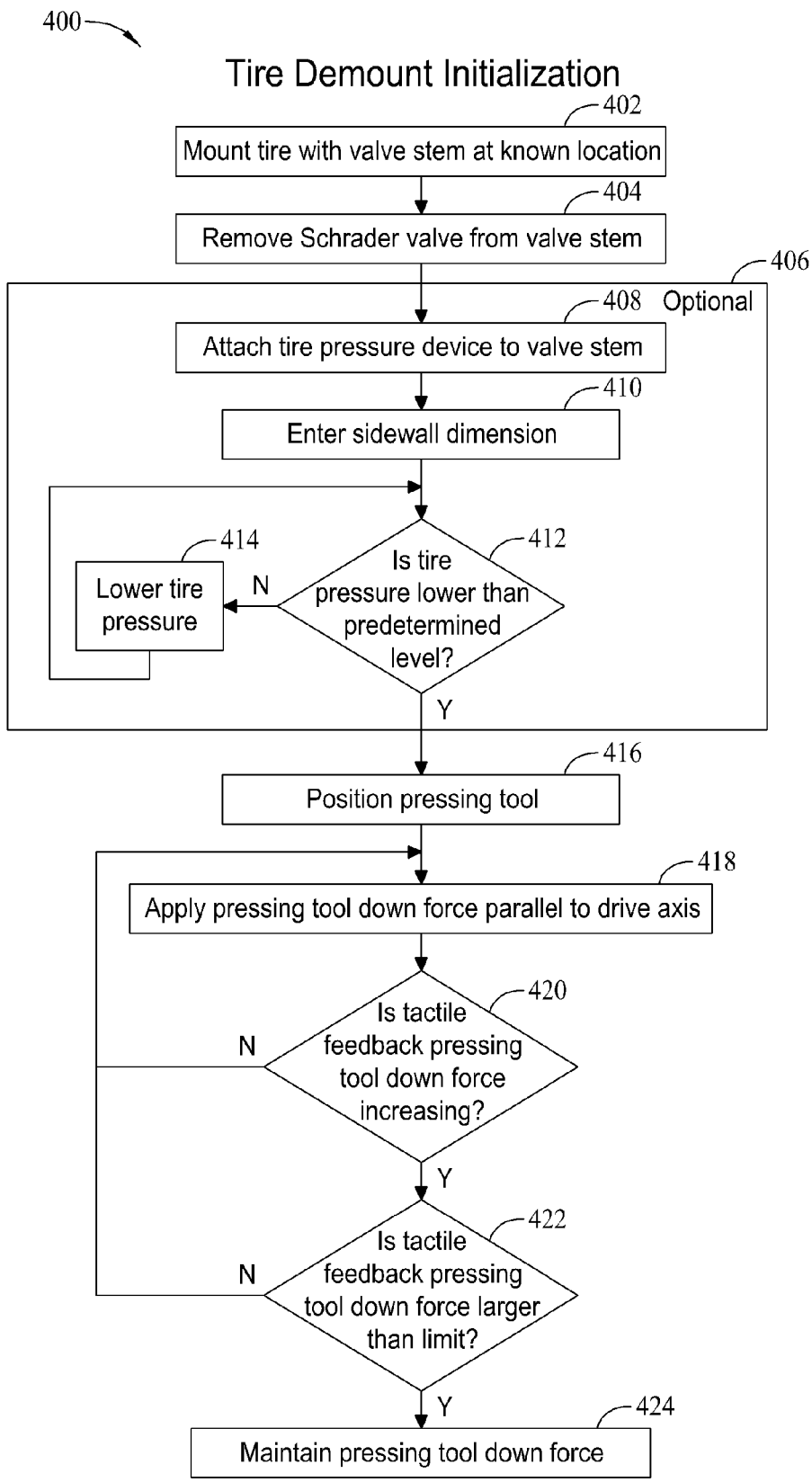

FIG. 11 illustrates a method flowchart 400 of preparing a tire for unseating a tire bead from the wheel rim bead seat utilized by the machine 100 (FIGS. 1a, 1b, 1c) to change tires 108. FIG. 11 is provided as a non-limiting example of various processes that can be implemented in and executed by the controller 152 in the control systems shown in FIGS. 2-9.

As shown in FIG. 11, the method 400 starts by the operator mounting the tire 108 on the machine 100 with the valve stem at a known rotational location on the machine 402 and appropriately securing the wheel rim to the machine at step 402. Mounting the tire at step 402 with the valve stem at a known location 402 allows for positional tactile feedback of the valve stem location to a controller 152 from the position sensor element 164.

Once mounted, the operator at step 404 removes the Schrader valve (wheel sensor) from the valve stem or removes the entire valve. The normal industry practice is to let the air pressure drop to an equalized level with the air pressure outside the tire. However, the operator can use an optional tire pressure tool at step 406 which controllably lowers the tire pressure to an acceptable level for demounting the tire. At step 406, the operator would attach the pressure device at step 408 to the valve stem after removing the Schrader valve (wheel sensor), or alternatively attach the pressure device at step 408 to the valve stem hole after removing the valve stem. Using operator input selectors 110, the operator enters the aspect ratio of the tire, a rim bead diameter (nominal rim diameter) and tire outside diameter at step 410 so that the controller 152 knows the propensity of the tire sidewall to roll over or give way to the force of the tool before the tire bead can be unseated from the bead seat of the rim, aspects of which may be stored in the memory of the controller 152. The controller 152 can recall the amount of recommended pressure for the entered aspect ratio and adjust the pressure in the tire to the recalled level at steps 412 and 414. Some tires with larger aspect ratios may benefit from having some amount of air pressure in the tire for unseating the bead.

Because the pressure device would stay connected as the wheel rim is rotated it is advantageous for the pressure device to come up through the center of the tire changing machine so that it is easier to rotate while attached to the rim.

Alternatively, the aspect ratio may not be entered at all. Instead, the optional tire pressure device may provide tactile feedback with a connect/no connect output to the controller 152. If the optional tire pressure device is connected the operator has determined that they would like some air pressure in the tire for unseating the bead and the controller 152 lowers the pressure to a predetermined amount. If the optional tire pressure device is not connected then the operator has chosen to let all of the air pressure out of the tire for unseating the bead.

At step 416, the operator may position the tool on the sidewall of the tire near the rim lip. Alternatively, an automated tire changing machine embodiment that includes positioning sensors such as an imaging type of sensor, which can detect where the wheel rim edge ends and the tire begins, could undertake step 416 automatically.

Steps 418, 420, 422 and 424 adjust the force of the tool so that the tool is engaging or touching the tire sidewall surface but the controller is not applying the kind of pressure needed to remove the bead from the bead seat of the rim. Likewise, if the operator is applying the pressure with an operator input selector 110, the controller 152 limits the amount of pressure the operator can apply using the tool's tactile feedback. Once a desired level of pressure has been reached, it is maintained until the controller 152 is ready to change it. As such, if the position of the tool changes, the down force of the tool is maintained throughout the change of position.

Figure 12:
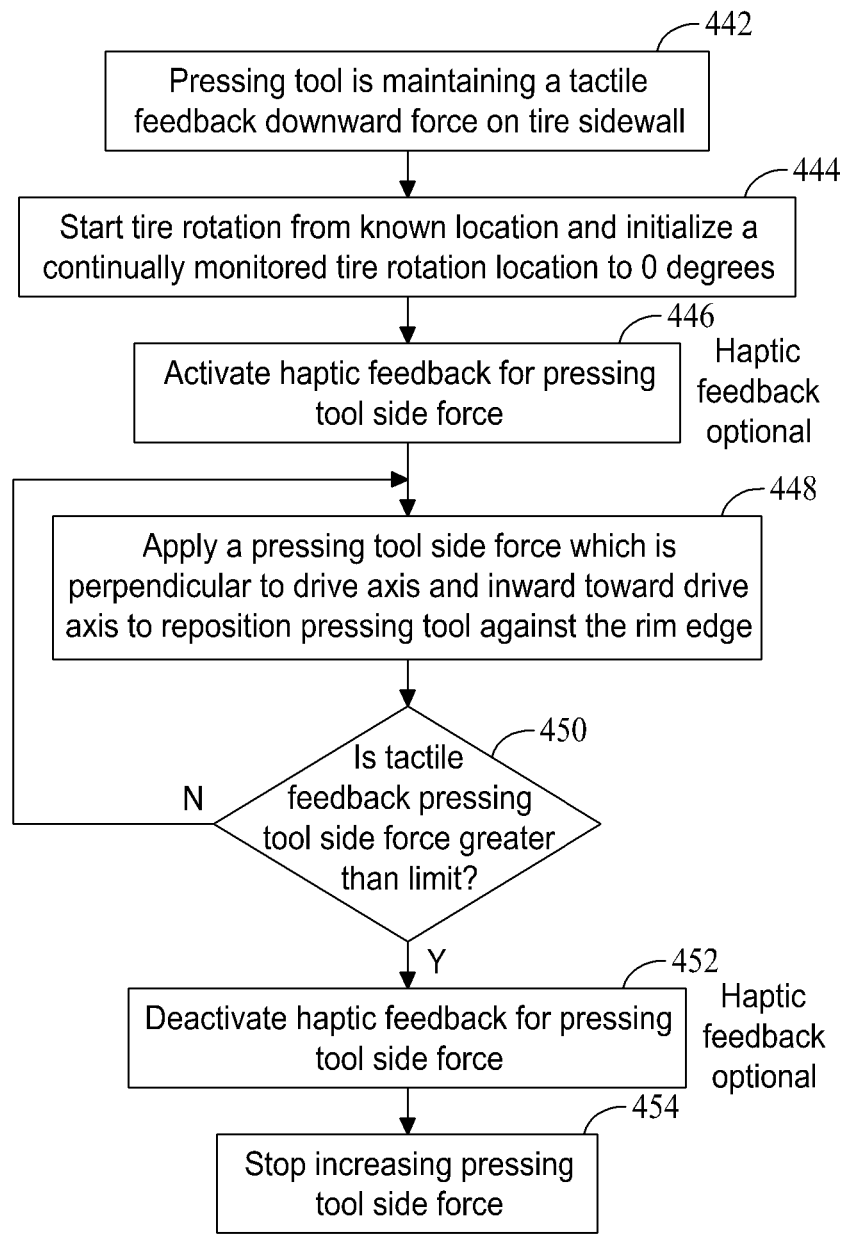

FIG. 12 illustrates a method flowchart 440 of utilizing the tactile feedback of the machine 100 (FIGS. 1a, 1b, 1c) to position a tool next to the rim 106. FIG. 12 is provided as a non-limiting example of various processes that can be implemented in and executed by the controller 152 in the control systems shown in FIGS. 2-9.

As shown in FIG. 12, the method 440 starts at step 442 with the tool maintaining a down force (i.e., a force in the direction of arrow B in FIG. 1b) on the tire sidewall using down force tactile feedback sensing on a mounted tire secured to the machine 100. The force or pressure maintained at step 442 may be carried over from step 424 of FIG. 11, or otherwise selected by an operator or determined by the controller in different exemplary embodiments.

The rotational location of the mounted tire is then sensed at step 444 to initialize the rotational home position before starting the rotation of the mounted wheel rim and associated tire. One of the optional haptic sensing modes may be activated at step 446 at this point to give the operator a signal that lateral force (i.e., in the direction of arrow C in FIG. 1b) is being applied to the tool at step 448.

The lateral force applied to the tool moves the tool against the edge of the wheel rim. When the tool impinges the relatively unmovable rim edge the lateral force pressure increases. The increase in the lateral force pressure of the tool is sensed and fed back to the controller 152 as tactile feedback so that the controller 152 can determine at step 450 when the tool has been repositioned next to the rim edge. To make this determination at step 450, the controller 152 can compare the sensed lateral force to a predetermined value recalled from the controller's memory or the controller can compare the sensed lateral force to the initial lateral force prior to lateral movement of the tool. Once the tool has been repositioned the optional haptic system's side lateral mode may be deactivated 452 and the increasing lateral force pressure may be stopped and maintained at step 454 by the controller 152.

Additionally, if the tool should not impinge the rim edge and continue to be repositioned inward toward the axis of rotation 112 (i.e., in the direction of arrow C in FIG. 1b), the tactile feedback sensing for tool position can be used. The sensed position of the tool is sent to the controller 152 and the controller 152 can compare the position to a predetermined position limit recalled from memory for the tool. If the position limit is reached the lateral force would stop and an optional alarm 166 would activate and/or and an optional display 124 would display instructions for the operator.

In an alternative embodiment, the tool is placed over the sidewall of the tire. Using a first tactile feedback for the tool, the tool is lowered in a direction parallel to the wheel rim's axis of rotation (i.e., the axis 112 in FIG. 1a) until the force feedback sensor indicates an increase in force. The increase in force indicates that the pressing tool is contacting or touching the compliant side wall of the tire enough to deflect it slightly. The machine drive motor 172 is then engaged to rotate the wheel rim mount 174. With the wheel rim mount rotating and the tactile feedback for the tool maintaining a force to keep the tool engaged with the tire sidewall, the tool is moved laterally or perpendicular to the wheel rim's axis of rotation (i.e., in the direction of arrow C in FIG. 1b) while a second tactile feedback for the pressing tool is monitored. The second tactile feedback detects and monitors the lateral force, as opposed to the axial force detected and monitored by the first tactile feedback. When the second tactile feedback for the tool shows an increase in force it indicates that the tool is in contact with and placed against the rim edge. The rim edge location can be confirmed by the controller 152 when the second tactile feedback shows a force that is above a predetermined limit, a predetermined rate of force increase, or a combination of force limit and rate of force increase. The force limit and rate of force increase may be empirically determined, with the controller 152 comparing detected forces and rate of force increases to the empirically established ones to distinguish a normal or proper tool operation from an error condition.

With the edge of the rim having been detected, the first tactile feedback for the pressing tool is utilized to increase force in the axial direction, while the second tactile feedback is used to maintain a sufficient amount of lateral force to keep the tool in contact with the edge of the wheel rim. The axial force is increased as the wheel rim mount 174 is rotated until either a maximum force is detected (signifying an error condition) or until there is a drop in axial force detected (signifying that the tire bead has been unseated from the bead seat of the wheel rim).

In another embodiment, a diagnostic procedure is possible. Configured with the force and position sensing as described, the tool may be used to detect abnormalities in the tire. To do so, the tool applies force to any position on the tire sidewall including the tire bead as wheel rim mount 174 is rotated. The controller 152 monitors the force feedback and the movement of the tool, and deviations in detected force and movement may be used to detect tire abnormalities. If abnormalities are detected, instructions or warnings may be displayed on the optional display 124. An exact rotational location of a tire abnormality can be identified and stored by the controller 152 by monitoring rotation of the wheel mount 174 as well the force and movement of the tool. Once the rotational location of a tire abnormality is known, the wheel rim mount 174 can be rotated to a position which the operator can identify and inspect the detected abnormality.

In order to break the bead of the tire, the bead breaker tool moves primarily in an axial direction (i.e., the direction of arrow B in FIG. 1b). The bead breaker tool is moved in the lateral direction (i.e., the direction of arrow C in FIG. 1b), however, to keep the tool as close to the bead as possible to facilitate optimal bead breaking. The lateral movement of the bead breaker tool causes it to be partly inside, or underneath the bead flange of the wheel rim as shown in FIG. 1c. At this point, if the bead breaker tool (i.e., the tool 116 shown in FIGS. 1a, 1b and 1c) is retracted in the axial direction (opposite to arrow C in FIG. 1b), the tool would strike the bead flange and potentially damage the wheel rim or the tool. It is therefore desirable to monitor tool position as well as force in this aspect of the procedure. When it is sensed that the tool is in contact with the tire sidewall and at a proper initial position, the controller may record or store the initial location of the tool. As the bead breaking procedure progresses, the path of the tool is monitored and can be retracted along the same path to avoid inadvertent contact with the rim. Both the upper and lower tools 116 can be controlled in such a manner.

Figure 13:
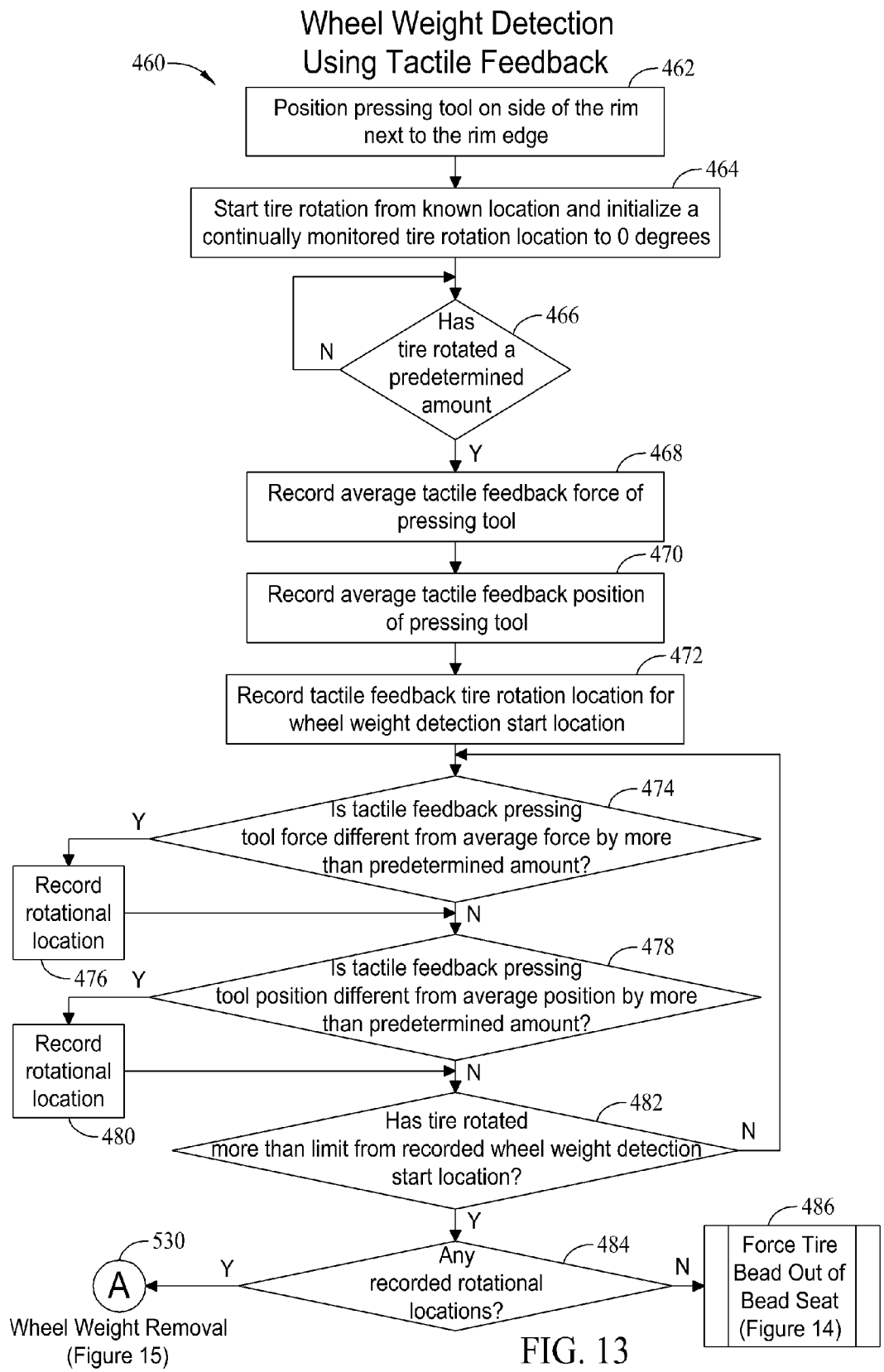

As shown in FIG. 13, a method of detecting wheel weight 460 starts at step 462 with the tool properly positioned against the rim edge and adjacent tire secured to the machine 100. The tool may be located as the result of the routine shown in FIG. 12, may be manually performed by the machine operator, or may be otherwise determined in various examples.

The rotational location of the mounted tire is then sensed at step 464 to initialize the rotational home position to the controller 152 before starting the rotation of the mounted wheel rim and tire. The wheel rim mount is then rotated at step 466 by a predetermined amount to obtain an average of force and/or position readings of the tool at steps 468 and 470.

The average values obtained at steps 468 and 470 are used as a filter to remove any sensed wheel weight obstruction from the force and position readings obtained by the control system. It is realized that the average could be determined for such filtering purposes in various ways, such as the mean, median, or moving average of the values.

After establishing the position and force of the tool against the rim with no wheel weights at steps 466 to 470, the rotational location of the mounted tire is again sensed to initialize the rotational position sensing to the controller 152 before starting the determination procedure of any wheel weight locations as the tire is further rotated at step 472. Steps 474, 476, 478, 480, and 482 utilize the tactile feedback provided to the controller 152 of the sensed tool force and position and rotational position of the rim to determine when either the tool force or position varies from the established rim force and position from steps 466-470 by a predetermined amount for a complete revolution of the mounted wheel rim and tire assembly. If a tool force and position variation occurs the controller 152 records the rotational position and variation information at steps 476 and 480.

Figure 14:
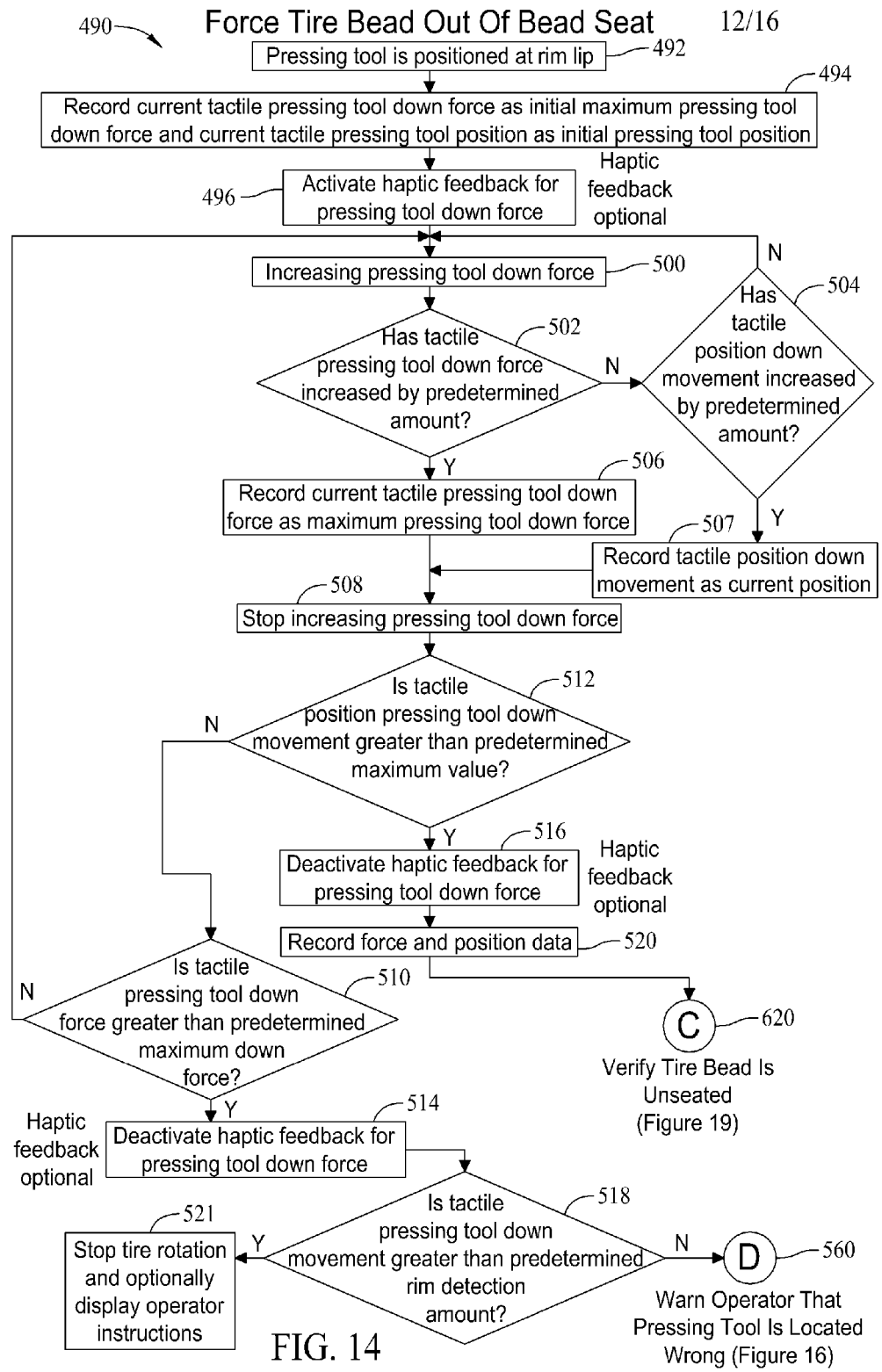

Once the rim has been inspected by the machine 100 for wheel weights, the controller 152 either determines that wheel weights need to be removed (described in relation to FIG. 15 and method 530) or that the rim has no wheel weights and is ready to have the tire bead unseated from the rim bead seat (described in relation to FIG. 14 and method 490). It should be realized that any number of mechanical implementations which sense force and/or position could be used to detect the wheel weight location on a rim similar to the described method of using machine 100's tool. It should also be realized that an alternative to using the sensed position or sensed force of a mechanical apparatus moving along the rim of the tire would be to use other types of sensing such as vision sensing, ultrasonic sensing, and electrical conduction sensing for sensing the location of a wheel weight.

An exemplary method 490 shown in FIG. 14 used to force the tire bead from the rim bead seat starts with the tool being positioned at step 492 on the sidewall of the tire and against the edge of the wheel rim. At this point, there is already some force against the tire sidewall and some force against the rim edge. It should be realized that the force against the rim is maintained as the force against the tire sidewall and more specifically the force against the tire bead increases. Maintaining the force against the rim is necessary to force any tool between the wheel rim and the tire bead. Steps 498-512 focus on adjusting only the pressure against the tire, but because tactile feedback is provided to the controller 152 for force and position of the tool, the controller 152 can recall from memory any number of algorithms, methods, or procedures for increasing or decreasing the force against the tire and the rim. These algorithms, methods, or procedures also include changing the speed and/or direction of the rotating wheel mount based on tactile feedback to the controller 152 of position, speed, and direction of the rotating wheel mount. Because this exemplary method focuses only on the force against the tire, step 494 has the controller 152 only recording the tactile feedback of the tool force against the tire to initialize what will become the maximum tire force used to unseat the bead from the bead seat of the rim and the current position of the tool to serve as a marker of where the tool started. Note that the position of the tool could be any or all of the relative or absolute positions along an x, y and/or z axis of a Cartesian coordinate system. A mode for the optional haptic feedback system to the operator is then activated at step 496 for the increasing down force of the tool against the tire.

Steps 500 and 502 increase the force of the tool against the tire until the force has increased by a predetermined amount. If there is no increase in force then at step 504 the controller 152 looks for downward movement of the tool in the axial direction (i.e., in the direction of arrow B in FIG. 1b). Downward movement of the tool, if present, in combination with a decrease in detected tool force indicates that the tire bead has been unseated from the rim bead seat. If no downward movement of the tool is detected, the controller 152 continues to increase the downward force. If the pressing tool force increases by a predetermined amount, the controller records the force at step 507 prior to stopping the application of force at step 508. If the tool has moved a predetermined maximum amount for detecting the unseating of the tire bead at step 512 then the optional haptic system can be turned off at step 516 and the force and position data can be recorded at step 520 before verifying the tire bead seat is unseated (described in relation to FIG. 19 and method 620).

If the tool hasn't moved a predetermined maximum amount at step 512 then the amount of tool force against the tire is compared at step 510 to a predetermined maximum amount of force. If a predetermined maximum amount of force hasn't been exceeded then the force continues to increase at step 500. If on the other hand the maximum amount of force has been exceeded, the optional haptic system is deactivated at step 514 and the amount of movement is checked at step 518 to determine if movement is related to the rim or to the tire bead. If there wasn't enough of a predetermined movement then steps are taken to verify the position of the tool (described in relation to FIG. 16 and method 560). If there was some movement then the tire rotation is stopped and instructions to the operator are presented to the operator at step 521.

Figure 15:
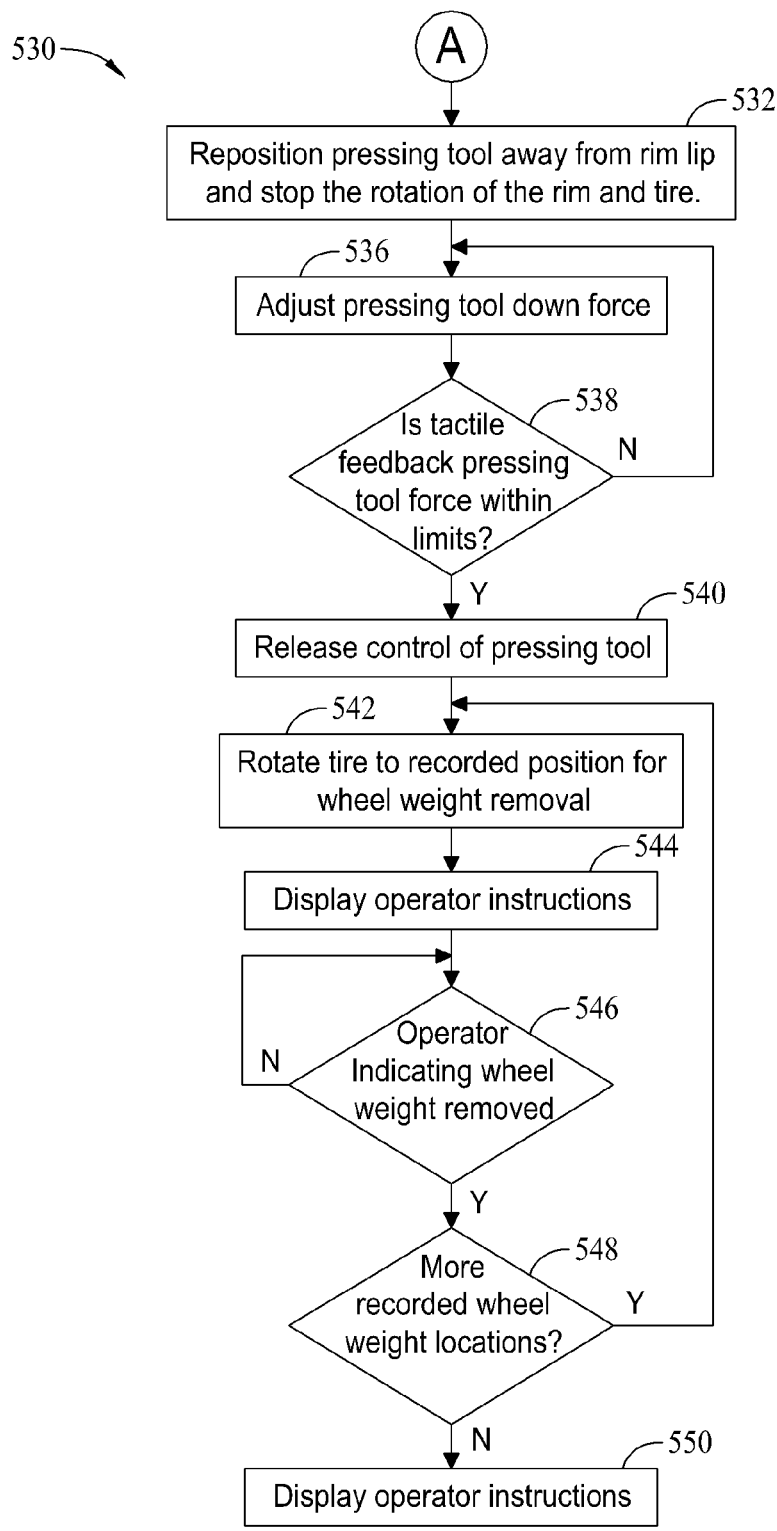

An exemplary method 530 for wheel weight removal is shown in FIG. 15. In method 530, it is assumed that the controller 152 already has knowledge of the existence and location of wheel weights on the mounted rim from a previous method such as via the method 460 shown in FIG. 13. It is very likely that the tool is against the rim lip where wheel weights may be installed so the first step is to reposition the tool away from the rim lip at step 532. The controller 152 does this by controlling the forces that move the tool and receiving tactile feedback on both force and position of the tool. At steps 536, 538 and 540 the controller 152 releases the forces on the tool and then any control 540 that the machine 100 had on the tool.

The controller 152 may then recall from memory the location of a wheel weight, and at step 542 rotates the wheel rim to a location that is convenient for an operator to remove the wheel weight. Instructions to the operator may be displayed on the optional display 124 at step 544. After the operator has removed the wheel weight, the operator uses an operator input selector 110 to signal to the controller 152 at step 546 that the wheel weight has been removed. The controller 152 then recalls at step 548 any other locations that a wheel weight may have been found, and if such locations exist the controller 152 runs steps 542, 544, and 546 again. If there are no other locations then operator instructions are displayed to the operator on the optional display 124 at step 550.

Figure 16:
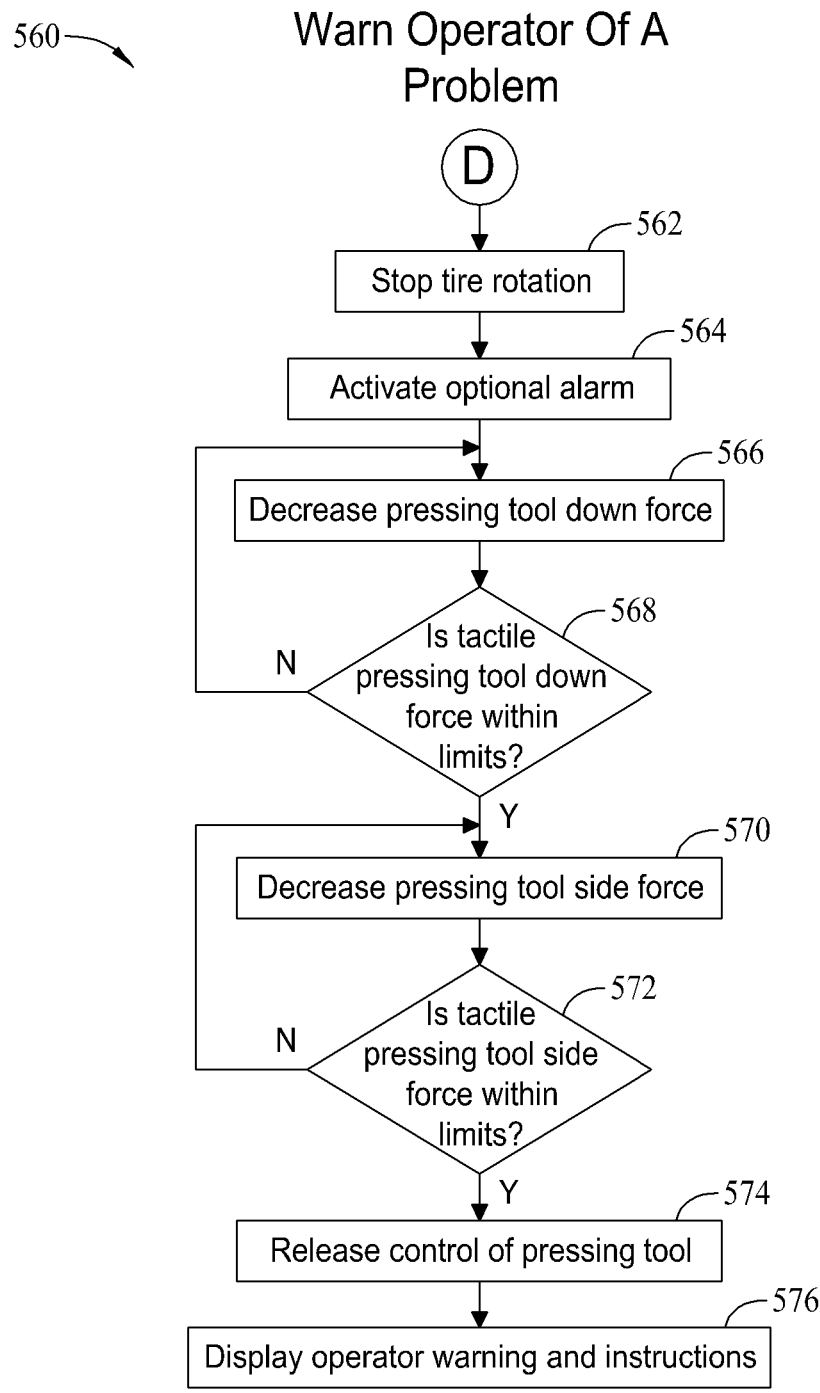

An exemplary method 560 for warning the operator of a problem is shown in FIG. 16. In method 560, many of the illustrated steps stop and release active components applying forces and warn the user of a problem. An exemplary method is also contemplated where the controller acts to stop force increases, but maintains forces generated, while still providing a warning to the machine operator of a potential problem.

Figure 17:
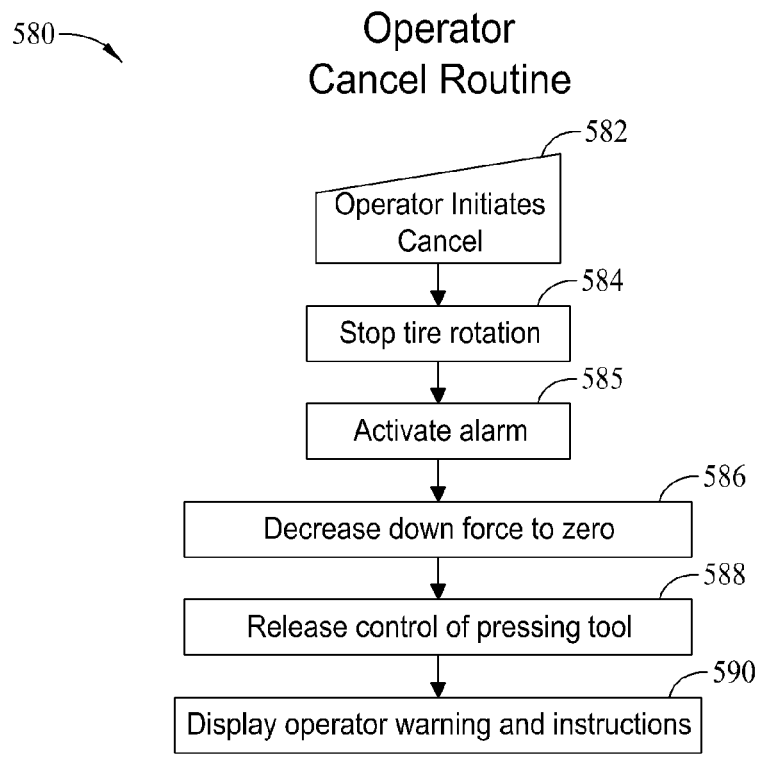

An exemplary method 580 for allowing the operator to cancel a routine on the machine 100 is shown in FIG. 17. The method 580 is similar to the method 560 (FIG. 16) in that many of the steps stop and release active components applying forces and display operator warnings and/or instructions. The primary difference is method 580 is activated by the operator interacting with an operator input selector 110 which interrupts whatever routine the controller 152 was in the process of executing, including but not limited to any of the methods described above. Method 560 on the other hand is initiated by the controller 152 as a response to a detected condition associated with any of the methods or control routines such as those described above.

Figure 18:
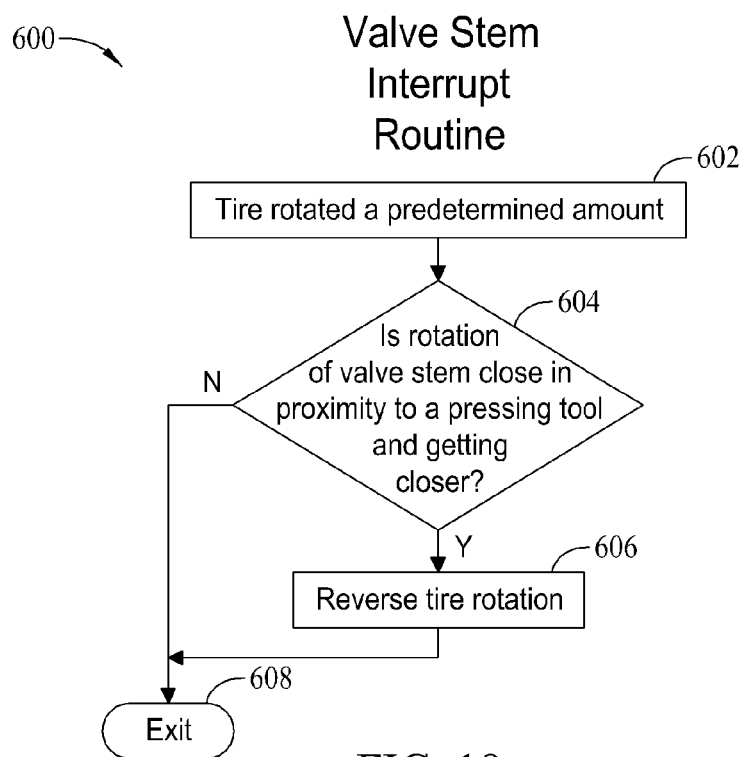

An exemplary Valve Stem Interrupt Routine is illustrated in FIG. 18 as method 600. The method 600 detects the location of the valve stem and reacts to it. In method 600, the tactile feedback for sensed tire rotation is continually sent to the controller 152 at step 602. The controller 152 determines at step 604 if the rotational location of the mounted tire's valve stem is such that a tool is near the valve stem. If the valve stem of the mounted tire is near a tool and getting closer, the tire rotation is reversed by the controller at step 606.

An alternative Valve Stem Interrupt Routine would be to use the tactile feedback and have the controller 152 remove some, but not all, of the forces on the tool as the valve stem location is rotated past the tool. It is important not to apply too much force in the area of a valve stem because of the high probability of the valve stem to have a tire pressure monitoring system (TPMS) sensor which could be damaged in the event that too much force is applied.

Figure 19:
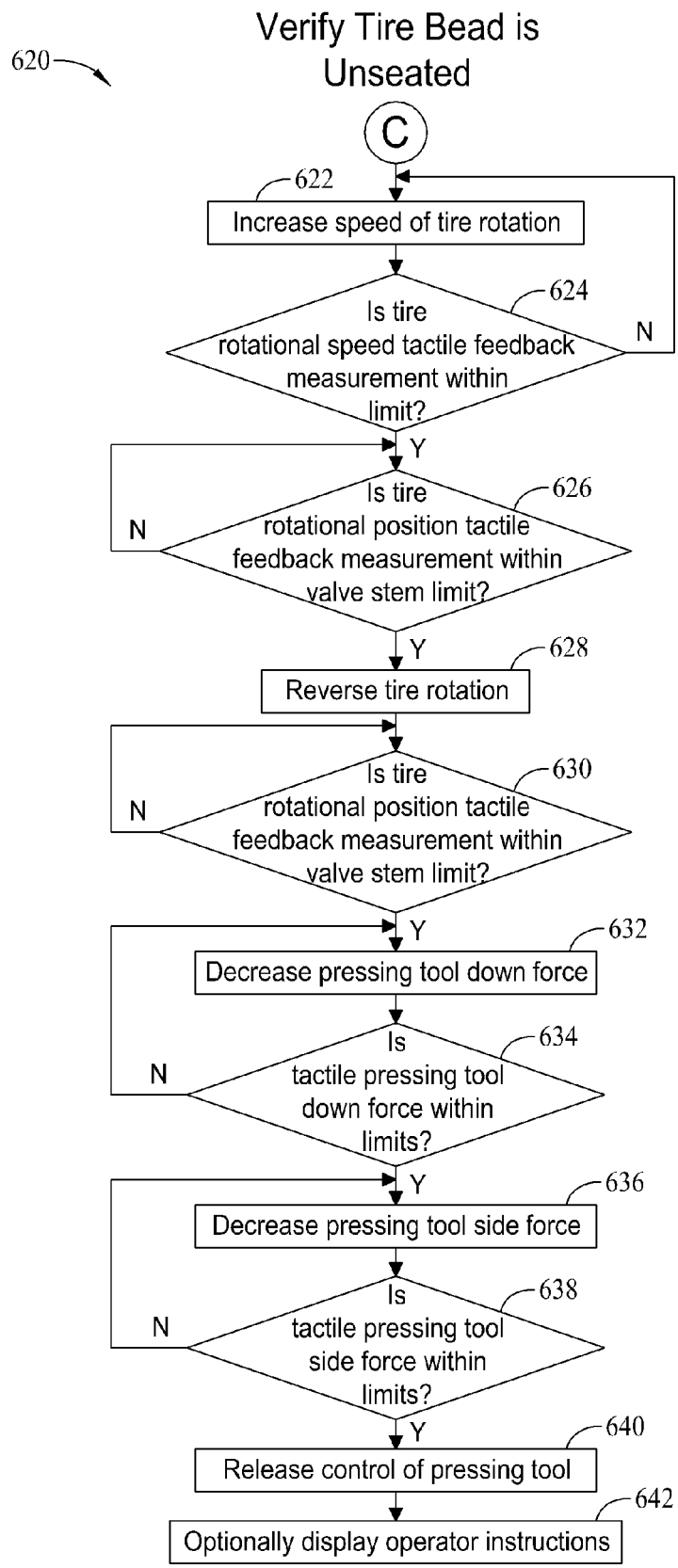

An exemplary method 620 for verifying that the tire bead has been unseated from the rim bead seat is shown in FIG. 19. It is assumed that the controller 152 of machine 100 has determined that the tire bead has been unseated at a rotational location of the mounted wheel rim and a force on the tool has been reduced from its maximum value. The speed of rotation of the mounted tire can be increased as step 622 to a speed within a limit 624 as a result of the reduction in a force of the tool. The current direction of rotation continues until the valve stem moves to within proximity of the tool 626. The tire rotation is then reversed 628 until the valve stem again moves to within proximity of the tool 630. The forces on the tool can then be decreased and control of the tool released in steps 632, 634, 636, 638 and 640. Instructions are then displayed to the operator at step 642 on the optional display 124.

Having now described the control systems and exemplary algorithms, routines and processes in relation to FIGS. 1-19, it is believed that those of ordinary skill in the art could program the controllers without further explanation to provide the functionality described.

The advantages and benefits of the invention are now believed to be amply disclosed in various embodiments. It is believed that those in the art could implement the methods and algorithms described above in appropriate controllers without further explanation.

It is now believed that the benefits of the invention has been amply illustrated by the exemplary embodiments disclosed.

In one embodiment, a tire changer machine for changing a tire on a wheel rim is described. The machine includes a base, a drive assembly coupled to the base and configured to rotate a wheel rim and associated tire about a rotational axis, and a control system. The control system includes at least one component configured to engage at least one of the tire, a wheel sensor, a wheel weight, a valve stem and the wheel rim in a tire change procedure. The control system also includes an actuator configured to move the component in the tire change procedure, and at least one sensor providing a feedback signal indicative of a force applied to one of the tire, the wheel sensor, the wheel weight, the valve stem and the wheel rim during the tire change procedure. A controller operates at least one of the drive assembly and the actuator in response to the feedback signal provided by the sensor during the tire change procedure.

Optionally, the component is a tire changing tool. The tire changing tool may be one of a bead pusher tool, a bead breaker tool, a tire mount tool, a tire inflation tool, and tire de-mount tool. The actuator may include one of an angular actuator and a linear actuator.

Also optionally, the feedback signal indicative of a force may correspond to one of a detected force, acceleration, torque, deflection and displacement generated by the component during the tire change procedure. The controller may be programmed to operate the actuator in response to the feedback signal indicative of a force to detect contact of the component to one of the tire, wheel sensor, wheel weight, valve stem and the wheel rim. The controller may also be responsive to the feedback signal indicative of a force to adjust the force applied to one of the tire and the wheel rim when the feedback signal exceeds a predetermined threshold.

The actuator may optionally be coupled to the component, and the sensor monitors operation of the actuator to provide the feedback signal indicative of a force applied to one of the tire, wheel sensor, wheel weight, valve stem and the wheel rim. The sensor may alternatively monitor a reaction force associated with the component to provide the feedback signal indicative of a force applied to one of the tire, wheel sensor, wheel weight, valve stem and the wheel rim. As another option, the feedback signal may be associated with the drive assembly to provide the feedback signal indicative of a force applied to one of the tire, wheel sensor, wheel weight, valve stem, and the wheel rim.

As still another option, The control system may further comprises at least one position sensor, the position sensor communicating with the controller and providing feedback concerning the position of at least one of the drive assembly and the component during a tire change procedure. The controller may be configured to store a plurality of distinct operational profiles for operation of the component during the tire change procedure. The controller may also be configured to automatically perform a selected one of the operational profiles. The controller may be configured to position the component to engage one of the tire, wheel sensor, wheel weight, valve stem and the wheel rim while monitoring the feedback signal concerning the position, and adjust operation of the machine when the feedback signal concerning the position exceeds a predetermined threshold. The position sensor may monitor a position of a tire changing tool or may monitor a position of the drive assembly. The drive assembly may include a drive motor and a wheel rim mount, with the position sensor detecting a rotational position of the wheel rim mount.

The tire change procedures may optionally include one or more of a bead breaking procedure, a tire demounting procedure, a tire mounting procedure, a wheel weight detection procedure, a rim edge location procedure, a valve stem location procedure, a tire pressure monitoring system detection procedure, a tire inflation procedure, a tire bead seat setting procedure, and a tire diagnostic procedure. An indicating element may be provided with the control system, and the controller may activate the indicating element in response to the feedback signal indicative of a force. The control system may also optionally include a display, with the controller providing operator instructions on the display, and the operator instructions being dependent on the feedback signal indicative of a force at a given point in time during the tire change procedure. A haptic system may also optionally be provided and coupled to the controller, with the controller activating the haptic system to provide tactile feedback to the machine operator based on the feedback signal indicative of a force.

An embodiment of a method of performing a procedure on a tire changer machine is also disclosed. The machine includes a drive assembly configured to engage a wheel rim and rotate the rim, at least one component facilitating the tire mounting or demounting, an actuator associated with the component, a controller operating the actuator, and a sensor-generated feedback signal indicative of a force applied to one of the tire, a wheel sensor, a wheel weight, a valve stem and the wheel rim during the procedure. The method includes, monitoring the feedback signal during the procedure, and detecting contact of the component to one of the tire, wheel sensor, wheel weight, valve stem and the wheel rim using the feedback signal.

Optionally, the method may further include providing an indication to a machine operator of a state of the feedback signal during the procedure. The control system may further include a position sensor providing feedback to the controller concerning a position of the component, and the method may further include monitoring a position of the component during the procedure, comparing the monitored position to an expected position for the procedure, and adjusting operation of the machine if the monitored position deviates from the expected position by a predetermined amount. Optionally, the control system may further include a position sensor providing feedback to the controller concerning a position of the component, and the method may include storing a position profile for a movement of the component during the procedure.

As another option, the method may also include, selecting an operational profile for operation of the component during the procedure, executing the selected profile, monitoring the feedback signal, and adjusting operation of the machine if the feedback signal exceeds a predetermined limit.

The method may optionally include detecting one of a location of a wheel weight, a wheel sensor location, and locating an edge of the wheel rim using the feedback signal.

The machine may include an optional haptic system, and the method may comprise activating the haptic system in response to the feedback signal.

The method may optionally include comparing the feedback signal to a predetermined limit, and adjusting operation of the machine if the feedback signal exceeds the predetermined limit. Adjusting operation of the machine may include reducing an actuating force for the component or changing one of a rotational position and speed of the drive assembly.

Monitoring the feedback signal may include monitoring one of force, acceleration, torque, deflection and displacement during the procedure.

The control system may also include an optional position sensor providing feedback to the controller concerning a position of the component, and the method may include determining a position of the component during the procedure. Determining the position may include monitoring one of position, speed, and acceleration of the component. Determining the position of the component may also include detecting one of a rotational position about a drive axis, an axial position in a direction parallel to the rotational axis, and a lateral position in a direction parallel to the drive axis.

Another embodiment of tire changing machine for changing a tire on a wheel rim is also disclosed. The machine includes a base, a drive assembly coupled to the base and configured to rotate a wheel rim and associated tire about a rotational axis, a rotational position sensor providing a feedback signal indicative of a rotational position of the drive assembly, and a controller operating the drive assembly in response to the feedback signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tire changer machine for changing a tire on a wheel rim of a wheel assembly, the machine comprising:
    a base;
    a drive assembly coupled to the base and configured to rotate a wheel rim and associated tire about a rotational axis; and
    a control system comprising:
    at least one component tool configured to engage said wheel assembly in a tire change procedure;
    an actuator configured to move said component tool in the tire change procedure;
    at least one sensor providing a feedback signal indicative of at least a measure of a varying amount of force applied by the at least one component tool to said wheel assembly during the tire change procedure;
    a controller operating at least one of said drive assembly and said actuator, in response to said feedback signal provided by the sensor during the tire change procedure, to alter a continued operation of either said actuator or said drive assembly;
    wherein said feedback signal is further indicative of a rate of change of said varying amount of force applied to said wheel assembly; and
    wherein said controller of said control system is further configured to alter operation of said drive assembly or said actuator responsive to a combination of said measure of, and said rate of change of, said varying amount of force.

2. The tire changer machine of claim 1, wherein said feedback signal indicative of the varying amount of force corresponds to either an actual force or a detected acceleration, torque, deflection or displacement generated by the component tool during the tire change procedure from which the actual force may be determined.

3. The tire changer machine of claim 1, wherein said controller is programmed to operate said actuator in response to said feedback signal indicative of the varying amount of force to identify physical contact of said component tool with said wheel assembly.

4. The tire changer machine of claim 1, wherein said controller is responsive to the feedback signal indicative of the varying amount of force to adjust the amount of force applied to said wheel assembly when said feedback signal exceeds a predetermined threshold.

5. The tire changer machine of claim 1, wherein said actuator is coupled to said component tool, and said sensor monitors operation of said actuator to provide said feedback signal indicative of the varying amount of force applied to said wheel assembly.

6. The tire changer machine of claim 1, wherein said sensor monitors a reaction force associated with said wheel assembly to provide said feedback signal indicative of the varying amount of force applied to said wheel assembly by said component tool.

7. The tire changer machine of claim 1, wherein said feedback signal is associated with said drive assembly to provide said feedback signal indicative of the varying amount of force applied to said wheel assembly.

8. The tire changer machine of claim 1, wherein the control system further comprises at least one position sensor, said position sensor communicating with said controller and providing feedback concerning the position of at least one of said drive assembly and said component tool during a tire change procedure.

9. The tire changer machine of claim 8, wherein said controller is configured to position said component tool to engage said wheel assembly while monitoring said feedback signal concerning the position, and adjust operation of the machine when said feedback signal concerning the position exceeds a predetermined threshold.

10. The tire changer machine of claim 8, wherein said position sensor monitors a position of said drive assembly.

11. The tire changer machine of claim 8, wherein said controller is configured to store a plurality of distinct operational profiles for operation of said component tool during the tire change procedure, each of said distinct operational profiles including component tool positional data and associated applied force limits.

12. The tire changer machine of claim 11, wherein said controller is configured to automatically alter a position of said component tool according to said positional data from a selected one of the operational profiles while monitoring said feedback signal indicative of the varying amount of force applied to said wheel assembly for comparison with said associated applied force limits.

13. The tire changer machine of claim 1, wherein the tire change procedure is one of a wheel weight detection procedure, a rim edge location procedure, a valve stem location procedure, a tire pressure monitoring system detection procedure, a tire inflation procedure, a tire bead seat setting procedure, and a tire diagnostic procedure.

14. The tire changer machine of claim 1, wherein said control system further comprises an indicating element, said controller activating said indicating element in response to said feedback signal indicative of the varying amount of force.

15. The tire changer machine of claim 1, wherein said control system further comprises a display, said controller providing operator instructions on said display, said operator instructions being dependent on said feedback signal indicative of the varying amount of force at a given point in time during the tire change procedure.

16. The tire changer machine of claim 1, wherein said control system further comprises a haptic system coupled to said controller, said controller activating said haptic system to provide tactile feedback to the machine operator based on said feedback signal indicative of the varying amount of force.

17. The tire changer machine of claim 1 wherein said controller of said control system is further configured to distinguish proper operation of said at least one component tool from an error condition in response to said feedback signal provided by said sensor during the tire changing procedure.

18. The tire changer machine of claim 17 wherein said controller is further configured to control said actuator to withdraw said component tool from engagement with said wheel assembly in response to an identified error condition.

19. The tire changer machine of claim 1 wherein said wheel assembly further includes one or more wheel elements selected from a set of wheel elements including tire pressure sensors, imbalance correction weights, and valve stems.

20. The tire changer machine of claim 1 wherein said component tool is one of a bead pusher tool, a bead breaker tool, a tire mount too, a tire inflation tool, and a tire de-mount tool.

21. The tire changer machine of claim 1 wherein said actuator is configured to move said component tool into, and out of, engagement with said wheel assembly.

22. The tire changer machine of claim 1 wherein said controller is further configured to control said actuator to reduce said varying amount of force applied to said wheel assembly in response to said feedback signal indicating a decrease in said applied force.

23. A method of performing a vehicle wheel assembly service procedure on a wheel assembly consisting of elements including at least a wheel rim and tire mounted thereon, using a tire changer machine including a drive assembly configured to engage and rotate the wheel rim, the machine including at least one component tool configured to engage the wheel rim assembly, an actuator associated with the component tool, a controller operating the actuator, and a sensor-generated feedback signal indicative of at least a varying amount of force applied by the component tool to the wheel assembly, during the vehicle wheel assembly service procedure, the method comprising:
  monitoring, with the controller, said feedback signal indicative of the varying amount of force during the wheel assembly service procedure;
  detecting, with the controller, based on a monitored feedback signal, physical contact of said component tool with said wheel assembly;
  altering a continued operation of either said actuator or said drive assembly in response to said detected physical contact;
  wherein said sensor-generated feedback signal is further indicative of a rate of change of said varying amount of force applied to said wheel assembly; and
  upon detecting physical contact of said component tool with said wheel assembly, identifying with said controller, an element of said vehicle wheel assembly in contact with said component tool, based on said rate of change of said varying amount of force.

24. The method of claim 23, further comprising providing an indication to a machine operator of the varying amount of force while the procedure is performed.

25. The method of claim 23, said control system further including a position sensor providing feedback to said controller concerning a position of said component tool, the method further comprising:
  monitoring a position of said component during the procedure;
  comparing said monitored position to an expected position for the procedure; and adjusting operation of the machine if said monitored position deviates from said expected position by a predetermined amount.

26. The method of claim 23, said control system further including a position sensor providing feedback to said controller concerning a position of said component tool, the method further comprising storing at least one operational position profile for a movement of said component during the procedure;
  selecting, from said stored position profiles, an operational profile for operation of the component tool during said procedure;
  executing said selected operational profile;
  monitoring said feedback signal indicative of the varying amount of force; and
  adjusting operation of the machine if the amount of force exceeds a predetermined limit.

27. The method of claim 23, said machine further including a haptic system, the method further comprising activating said haptic system in response to the feedback signal indicative of the varying amount of force.

28. The method of claim 23, further comprising:
  comparing said feedback signal to a predetermined limit; and
  adjusting operation of the machine responsive to said comparison.

29. The method of claim 28, wherein adjusting operation of the machine comprises altering an actuating force for said component tool.

30. The method of claim 28, wherein adjusting operation of the machine comprise changing one of a rotational position and speed of said drive assembly.

31. The method of claim 23, wherein monitoring said feedback signal indicative of the varying amount of force comprises:
  monitoring an acceleration, a torque, a deflection or a displacement during the procedure from which the varying amount of force can be determined.

32. The method of claim 23, said control system further including a position sensor providing feedback to said controller associated with a position of said component tool, the method further comprising:
  monitoring said position of said component tool during the procedure.

33. The method of claim 32, wherein said step of monitoring said position further includes monitoring a speed or an acceleration of said component tool.

34. The method of claim 32, wherein said step of monitoring a position of the component tool comprises monitoring one of a rotational position about a drive axis, an axial position in a direction parallel to the rotational axis, and a lateral position in a direction parallel to the drive axis.

35. The method of claim 23 further including the step of distinguishing, with the controller, proper operation of said at least one component tool from an error condition, in response to said feedback signal.

36. The method of claim 35 further including the step of withdrawing, by operating said actuator, said component tool from engagement with said wheel assembly in response to an identified error condition.

37. The method of claim 23 wherein said wheel assembly further includes one or more elements selected from a set of elements including tire pressure sensors, imbalance correction weights, and valve stems.

38. The method of claim 23 wherein said component tool is one of a bead pusher tool, a bead breaker tool, a tire mount too, a tire inflation tool, and a tire de-mount tool.

39. A method of performing a vehicle wheel assembly service procedure on a wheel assembly consisting of elements including at least a wheel rim and tire mounted thereon, using a tire changer machine including a drive assembly configured to engage and rotate the wheel rim, the machine including at least one component tool configured to engage the wheel rim assembly, an actuator associated with the component tool, a controller operating the actuator, and a sensor-generated feedback signal indicative of at least a varying amount of force applied by the component tool to the wheel assembly, during the vehicle wheel assembly service procedure, the method comprising:
  monitoring, with the controller, said feedback signal indicative of the varying amount of force during the wheel assembly service procedure;
  detecting, with the controller, based on a monitored feedback signal, physical contact of said component tool with said wheel assembly;
  altering a continued operation of either said actuator or said drive assembly in response to said detected physical contact; and
  wherein said control system further includes a position sensor providing feedback to said controller concerning a position of said component tool, the method further comprising identifying, responsive to said feedback signal indicative of the varying amount of force and a rate of change of said varying amount of force, one of a position of a wheel weight, a position of a wheel sensor, and a position of an edge of the wheel rim.

40. A tire changer machine for changing a tire on a wheel rim of a wheel assembly, the machine comprising:
  a base;
  a drive assembly coupled to the base and configured to rotate a wheel rim and associated tire about a rotational axis; and
  a control system comprising:
    at least one component tool configured to engage said wheel assembly in a tire change procedure;
    an actuator configured to move said component tool in the tire change procedure;
    at least one sensor providing a feedback signal indicative of at least a measure of a varying amount of force applied by the at least one component tool to said wheel assembly during the tire change procedure; and
    a controller operating at least one of said drive assembly and said actuator, in response to said feedback signal provided by the sensor during the tire change procedure, to alter a continued operation of either said actuator or said drive assembly;
  wherein said feedback signal is indicative of said varying amount of force applied to said wheel assembly along a first axis parallel to said rotational axis; and
  further including a second sensor providing a feedback signal indicative of at least a measure of a second varying amount of force applied along a second axis perpendicular to said rotational axis by the at least one component tool to said wheel assembly during the tire change procedure.

41. A method of performing a vehicle wheel assembly service procedure on a wheel assembly consisting of elements including at least a wheel rim and tire mounted thereon, using a tire changer machine including a drive assembly configured to engage and rotate the wheel rim, the machine including at least one component tool configured to engage the wheel rim assembly, an actuator associated with the component tool, a controller operating the actuator, and a sensor-generated feedback signal indicative of at least a varying amount of force applied by the component tool to the wheel assembly, during the vehicle wheel assembly service procedure, the method comprising:
  monitoring, with the controller, said feedback signal indicative of the varying amount of force during the wheel assembly service procedure;
  detecting, with the controller, based on a monitored feedback signal, physical contact of said component tool with said wheel assembly;
  altering a continued operation of either said actuator or said drive assembly in response to said detected physical contact;
  wherein said feedback signal is indicative of said varying amount of force applied to said wheel assembly along a first axis parallel to a rotational axis of said drive assembly; and
  monitoring, with the controller, a second feedback signal indicative of at least a measure of a second varying amount of force applied by the component tool to the wheel assembly along a second axis perpendicular to said rotational axis during the vehicle wheel assembly service procedure.

* * * * *